Sept. 1, 1959 C. G. TREADWELL 2,902,542
ELECTRIC PULSE CODE MODULATION SYSTEMS
Filed June 19, 1953 12 Sheets-Sheet 1

Inventor
CYRIL G. TREADWELL
By Philip M. Bolton
Attorney

Sept. 1, 1959 C. G. TREADWELL 2,902,542
ELECTRIC PULSE CODE MODULATION SYSTEMS
Filed June 19, 1953 12 Sheets-Sheet 3

Inventor
CYRIL G. TREADWELL
By Philip M. Bolton
Attorney

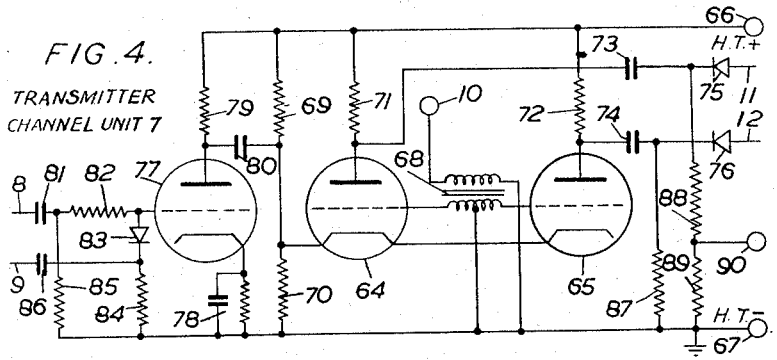
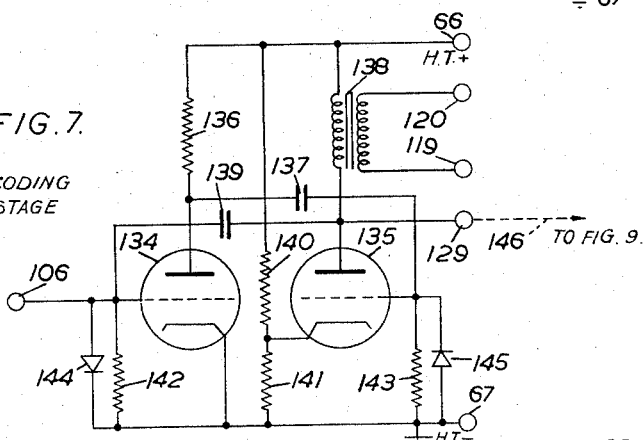
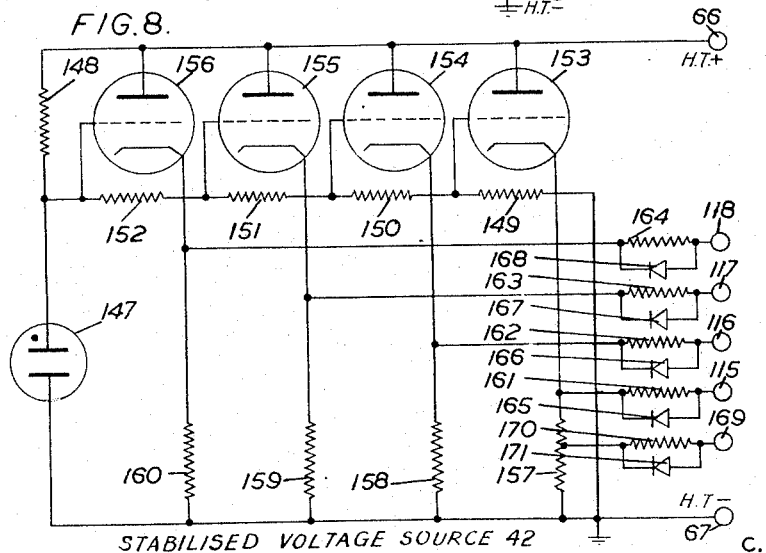

Sept. 1, 1959 C. G. TREADWELL 2,902,542
ELECTRIC PULSE CODE MODULATION SYSTEMS
Filed June 19, 1953 12 Sheets-Sheet 5
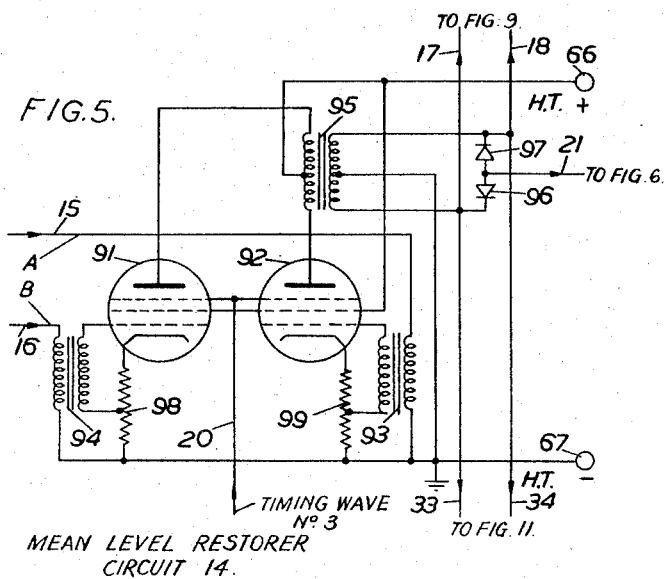
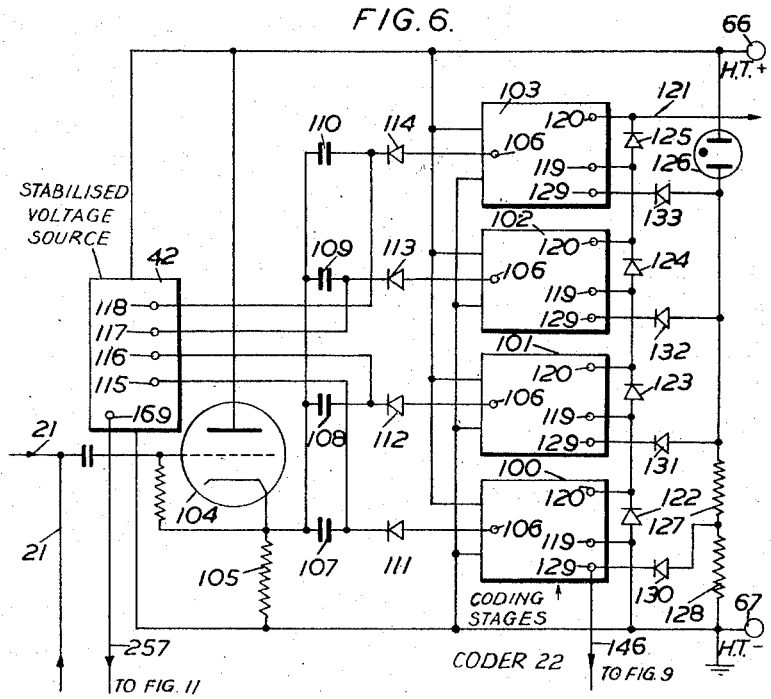
Inventor
CYRIL G. TREADWELL
By Philip M Bolton
Attorney

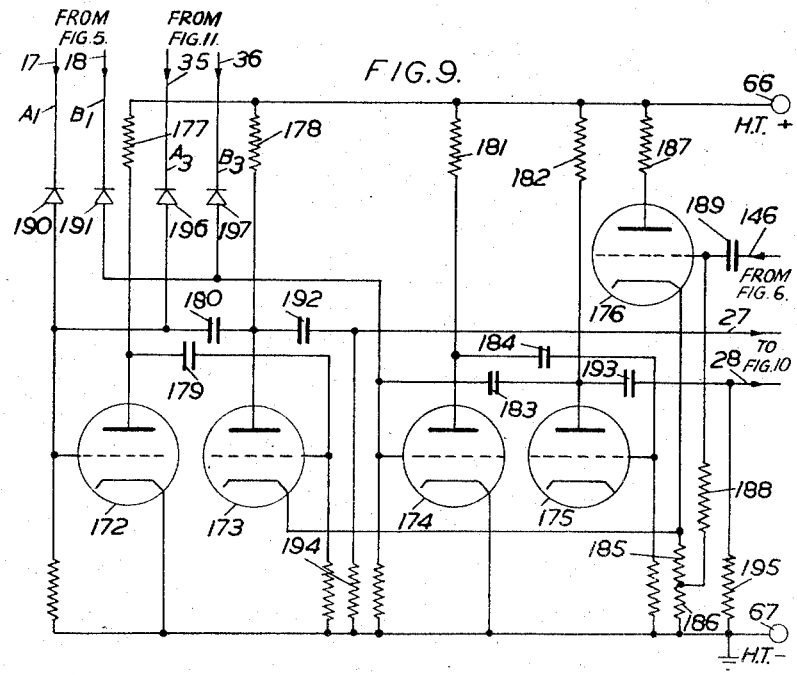
POLARISATION CONTROL DEVICE 19
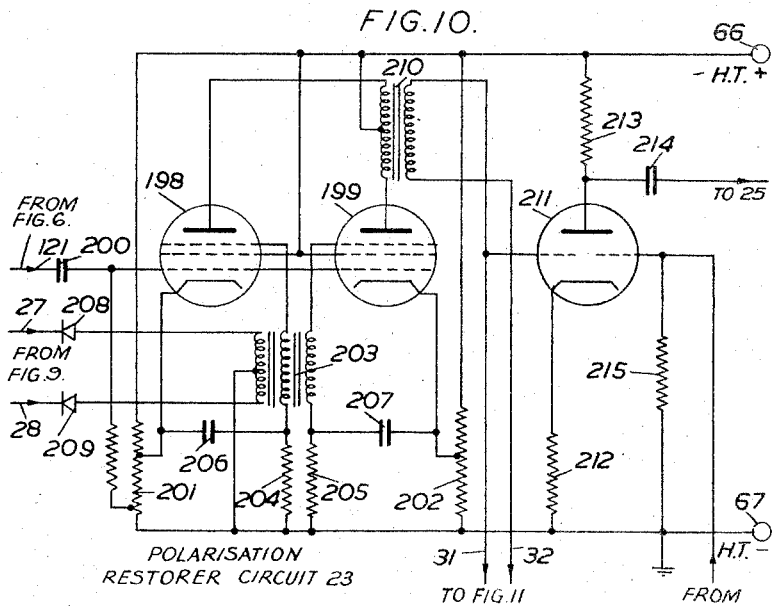
POLARISATION RESTORER CIRCUIT 23

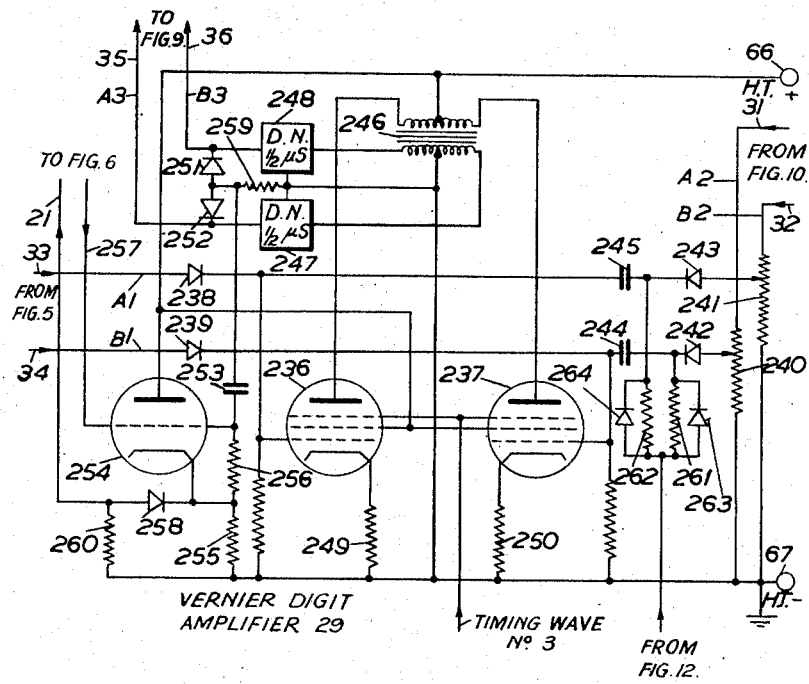

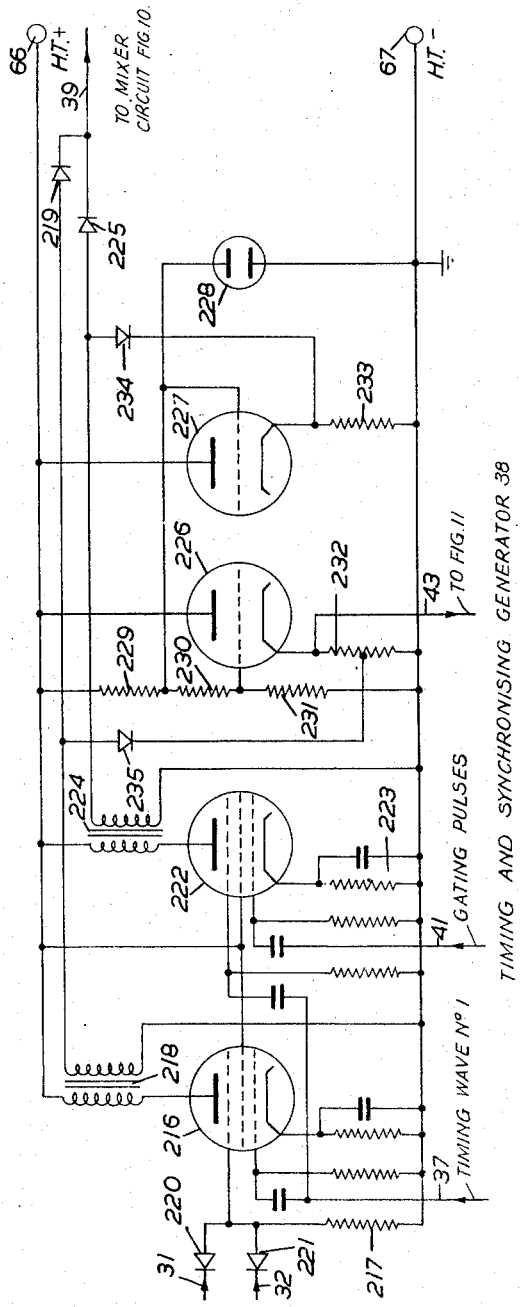

Sept. 1, 1959  C. G. TREADWELL  2,902,542
ELECTRIC PULSE CODE MODULATION SYSTEMS
Filed June 19, 1953  12 Sheets-Sheet 10
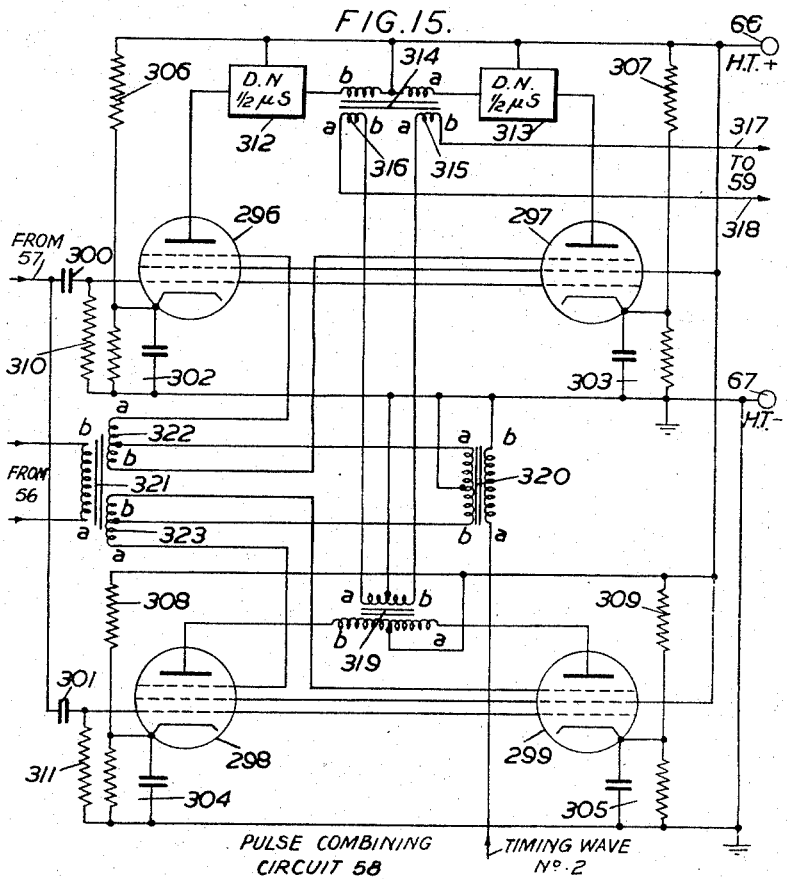
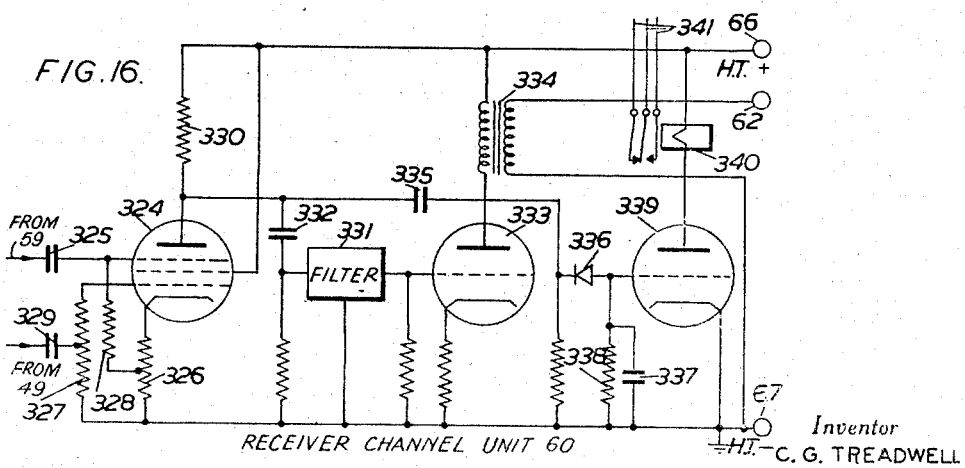
Inventor
C. G. TREADWELL
By Philip M. Bolton
Attorney

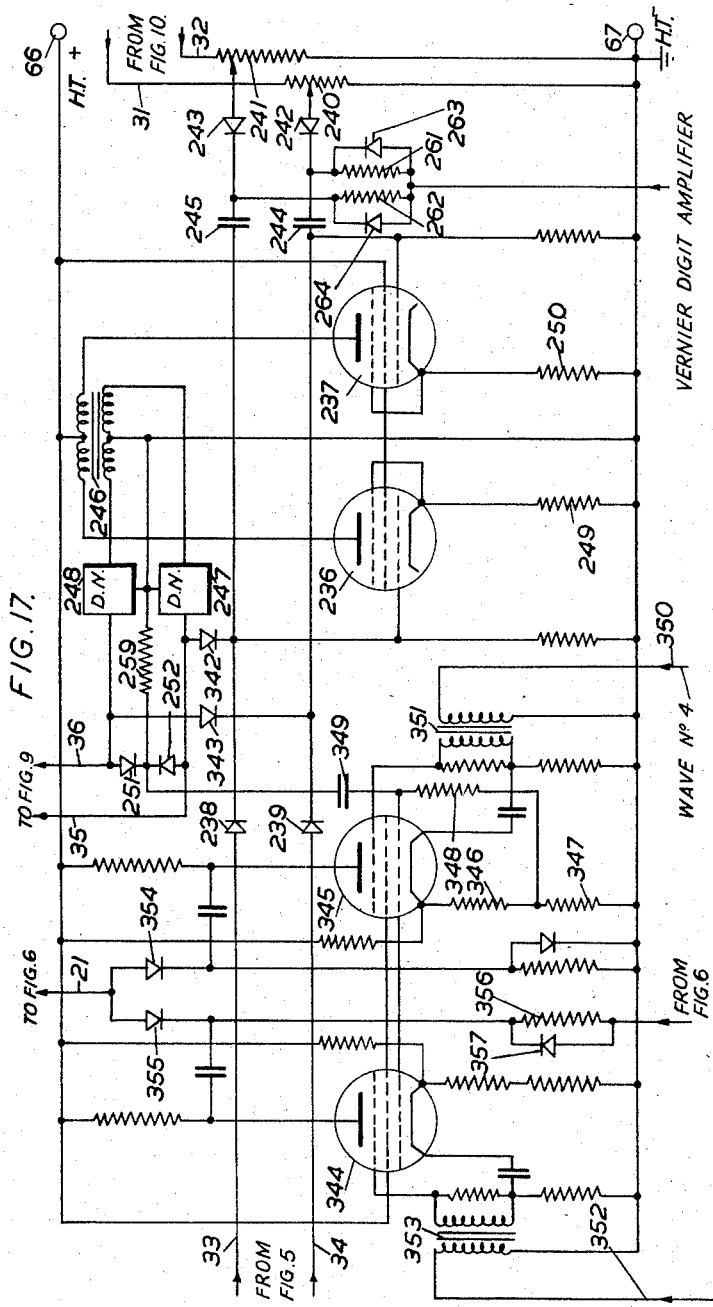

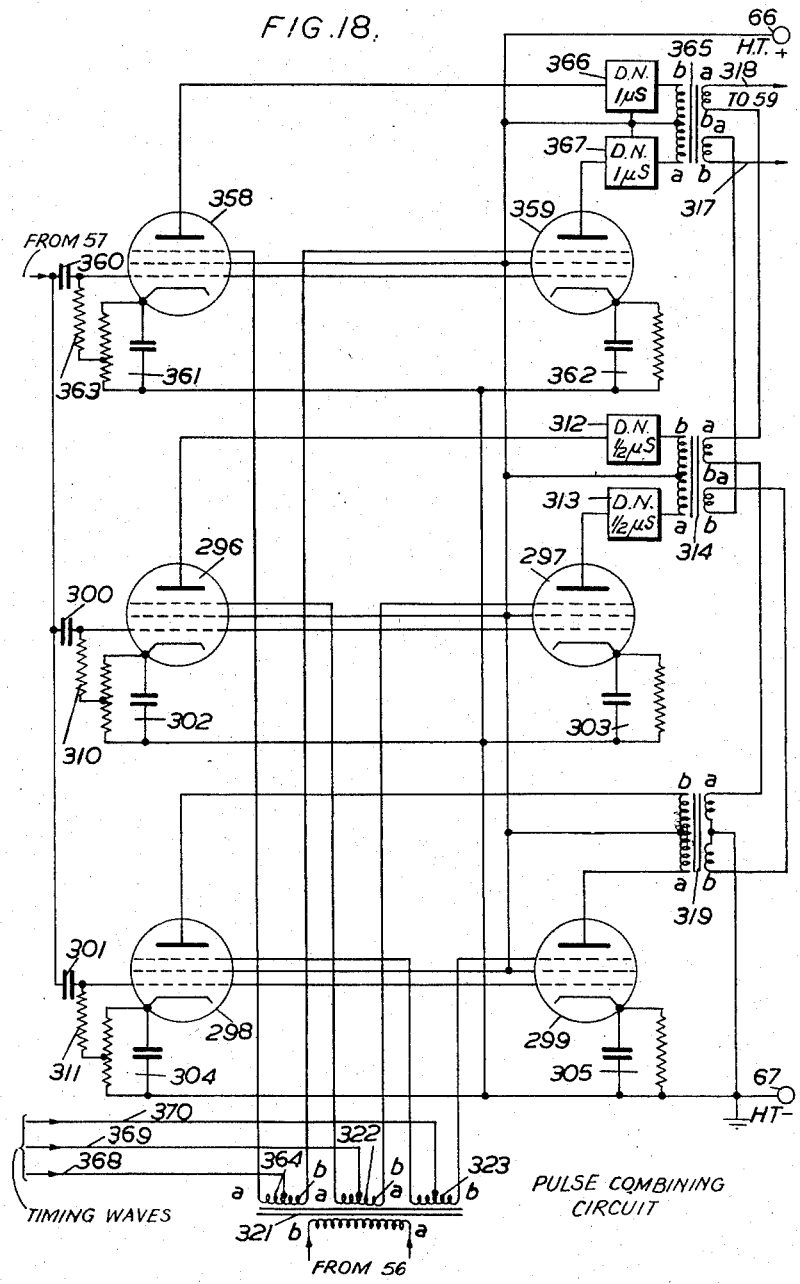

United States Patent Office 2,902,542
Patented Sept. 1, 1959

2,902,542

ELECTRIC PULSE CODE MODULATION SYSTEMS

Cyril Gordon Treadwell, London, England, assignor to International Standard Electric Corporation, New York, N.Y., a corporation of Delaware Application June 19, 1953, Serial No. 362,863

Claims priority, application Great Britain June 24, 1952

19 Claims. (Cl. 179—15)

The present invention relates to electric pulse code modulation systems of communication.

The system is of the kind described in U. S. Patent 2,272,070. In recent years a number of forms of pulse code modulation systems have been proposed, and the practical systems developed have generally utilised a binary pulse code for the reason that the best discrimination against the effects of noise is obtained when the receiver has only to recognise whether a code pulse is present or not. However, in order to provide a sufficient number of code combinations to enable the speech wave to be conveyed with sufficient fidelity, a binary code with at least six elements is necessary, and sometimes seven elements have been used.

Apart from the fact that the coding and decoding arrangements for a six or seven element code are complicated, the necessity for transmitting six or seven code pulses during each channel period without at the same time occupying an excessive frequency bandwidth seriously limits the number of channels which can be provided in any one system.

The present invention is based on the recognition that the immunity from the effects of noise of a binary code is unnecessarily high. Reliable commercial systems are always operated under conditions in which the signal-to-noise ratio is fairly good, and it follows that a pulse code may then be quite satisfactorily used in which each digit pulse represents more than two conditions. This having been recognised, a special advantage is secured if both positive and negative digit pulses are used, because the number of coding stages necessary to provide all the pulse levels can be halved.

The use of pulses representing more than two conditions is, of course, suggested in U.S. Patent 2,272,070 already referred to; and positive and negative code pulses have been suggested in a very special single pulse system described in British Patent No. 627,462 where the code pulses indicate the manner in which the speech wave amplitude is changing, not its actual value. The distinctive feature of the present invention is the use of both positive and negative digit pulses in a multi-digit code representing the actual amplitude values of the speech wave or other electrical wave to be conveyed.

The invention accordingly provides an electric pulse code modulation system of communication comprising means for sampling an electrical wave at frequently occurring instants, means for determining the amplitude of the wave at each of such instants with respect to a discontinuous amplitude scale having an equal specified number of positive and negative steps, means for generating in response to each sample of the electrical wave a group of one or more digit pulses according to a code of two or more elements, any digit pulse having an amplitude level selected from a series of equal positive and negative values, and means for transmitting the digit pulses over a communication medium.

The invention also provides a transmitter for an electric pulse code modulation system of communication comprising means for producing from a complex electrical wave a pulse of invariable sign, but having an amplitude representing the instantaneous amplitude of the said wave with respect to a mean level, quantising means for quantising the said pulse, separate means for indicating the sign of the said instantaneous amplitude with respect to the said mean level, means under the control of the said quantising means and of the said separate means for producing a group of one or more digit pulses according to a code of two or more elements, any digit pulse having an amplitude selected from $n$ positive and $u$ respectively equal negative amplitudes, where $u$ is an integer, and means for transmitting the digit pulses over a communication medium.

The invention further provides a receiver for an electric pulse code modulation system of communication in which an instantaneous amplitude value of a complex electrical wave is represented by a group of one or more digit pulses according to a code of two or more elements, any digit pulse having an amplitude selected from a series of $n$ positive and $u$ respectively equal negative amplitudes, where $n$ is an integer, comprising means for receiving the digit pulses from a communication medium, means for producing from each digit pulse an intermediate pulse of invariable sign, but having an amplitude representing the amplitude of the digit pulse irrespective of its sign, recording means for deriving from the intermediate pulse a derived pulse having an amplitude proportional to the instantaneous amplitude represented by the digit pulse when present by itself in the group, separate means for indicating the sign of the digit pulse, means under the control of the said recording means and of the said separate means for producing from the derived pulses corresponding to a group of digit pulses an output pulse which represents in quantised form an instantaneous amplitude value of the complex electrical wave, and means for recovering from the output pulse an approximate replica of the said complex electrical wave.

The digit pulses may, of course, be transmitted in any convenient way: they could, for example, be sent direct over a coaxial cable or other wire line. When, as in radio systems, it is necessary to convey the pulses by modulation of a carrier wave, it will be preferable to employ frequency modulation, which is most convenient when both positive and negative pulses have to be transmitted. This is, however, quite common practice and has other advantages.

The invention will be described with reference to the accompanying drawings, in which:

Fig. 1 shows a graphical diagram of the code employed in the preferred system according to the invention;

Figs. 2 and 3 respectively show block schematic circuit diagrams of the transmitter and the receiver of the preferred two-digit system according to the invention;

Figs. 4 to 12 show detailed circuits of certain elements of Fig. 2, namely:

Fig. 4 shows the circuit of a channel unit;
Fig. 5 shows the circuit of the mean level restorer;
Fig. 6 shows the circuit of the coder;
Fig. 7 shows the circuit of a coding stage of Fig. 6;
Fig. 8 shows the circuit of the stabilised voltage source;
Fig. 9 shows the circuit of the polarisation control device;
Fig. 10 shows the circuit of the polarisation restorer;
Fig. 11 shows the circuit of the vernier digit amplifier;
Fig. 12 shows the circuit of the timing and synchronising generator;

Figs. 13 to 16 show detailed circuits of certain elements of Fig. 3, namely:

Fig. 13 shows the circuit of the limiter and A.G.C. control device;

Fig. 14 shows the circuit of the stabilised voltage source;

Fig. 15 shows the circuit of the pulse combining circuit;

Fig. 16 shows the circuit of a channel unit; and

Figs. 17 and 18 show modifications of Figs. 11 and 15, respectively, for use in a system employing more than two digits.

Figure 1:
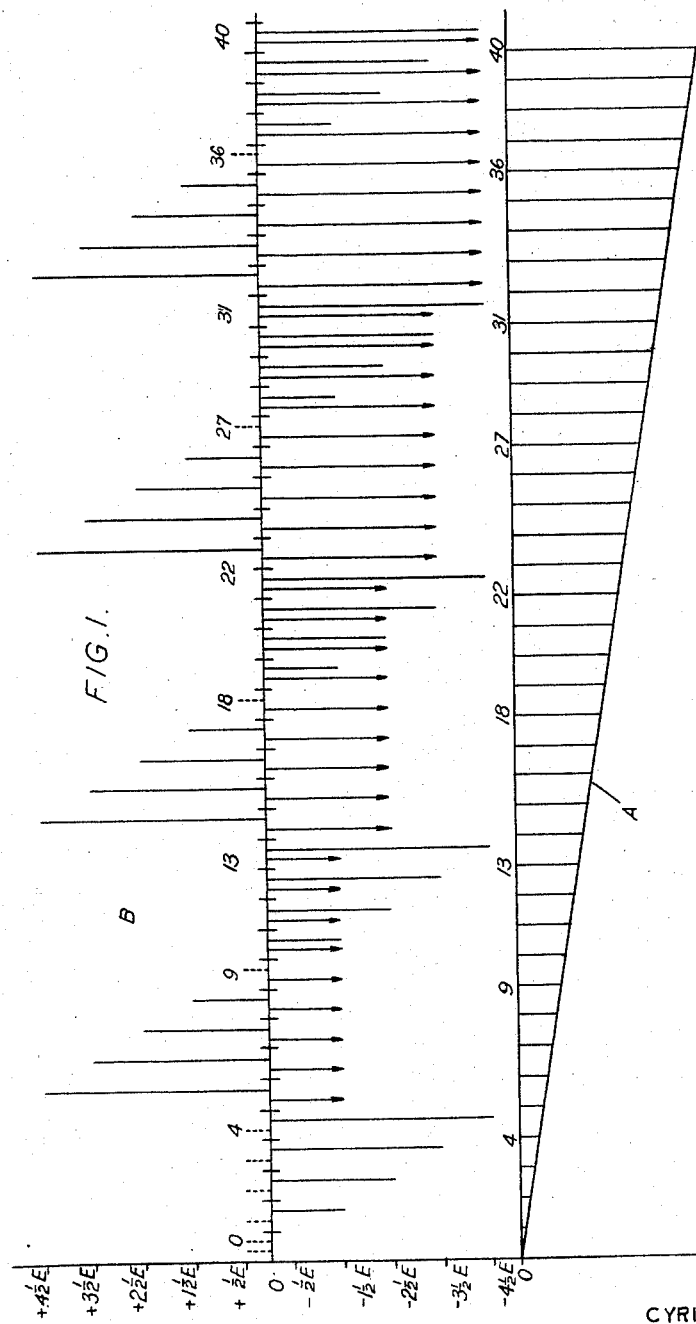

In its more general form, the code employed in systems according to the invention comprises groups of $m$ digit pulses each of which can have $n$ amplitude levels and can be positive or negative. Thus the total number of conditions represented by a digit pulse is $2n+1$, where zero amplitude, which is indicated by the absence of the pulse, corresponds to one condition. It follows that the total number of quantised amplitude steps (including zero) which the code can represent is $(2n+1)^m$. Various choices can be made for $m$ and $n$ according to the requirements which have to be met.

The embodiment of the invention to be described comprises a multi-channel communication system for conveying speech waves and supervisory signals, which it will be assumed cover a frequency band from zero to about 3,400 cycles per second. As is well known, the sampling frequency should be at least double the highest frequency of the speech band, and in the present case the sampling frequency is chosen to be 8⅓ kilocycles per second. The sampling period that is, the time interval between successive samples is thus 120 microseconds, and is conveniently divided into 120 channel periods each of one microsecond duration. Of these channel periods, one is set aside for a synchronising signal, and the remaining 119 periods is used for the code pulses of 119 corresponding communication channels.

The code to be adopted for this embodiment employs two digit pulses which are transmitted to represent each sample of a speech wave. Each digit pulse may be of either positive or negative polarity, and each may have one of four different amplitudes, which are the same whether the pulse is positive or negative. Thus each digit pulse can indicate nine amplitude values (including zero, which is indicated by absence of the digit pulse). The code is therefore capable of representing $9^2$ or 81 different amplitude values for the speech wave samples. In order to obtain as many quantised values as this with a binary code, seven digits would be necessary.

In order to produce the digit pulses in this embodiment, therefore, only four stabilised amplitude values are used for the production of both the positive and the negative digit pulses.

Since it is necessary to transmit both positive and negative pulses over the communication medium, it is most convenient to transmit them by frequency modulation of a carrier wave having a suitable mean frequency. This also has the advantage of being a constant amplitude system so that the amplitudes of the transmitted digit pulses are not affected by fading.

In this specification, it will frequently be stated that pulses are spaced apart by a certain interval. It is to be understood that the spacing applies to corresponding distinctive features of the pulses, such as the leading edges, and not the interval between the trailing edge of one pulse and the leading edge of the other.

In each of the aove-mentioned 119 channel periods of one microsecond duration, there will in general be transmitted two digit pulses spaced ½ microsecond apart, though sometimes one of them will be missing when the zero value is to be indicated. During the synchronising period a pair of synchronising pulses spaced apart by ½ microsecond will be transmitted. These synchronising pulses differ from the digit pulses in being of larger amplitude than the maximum amplitude which the digit pulses can assume, in order that the synchronising pulses can be recognised and selected at the receiver.

It will thus be seen that a train of digit and synchronising pulses spaced apart by ½ microsecond is transmitted by the transmitter, but some of the digit pulses will frequently be missing, according to the amplitudes of the samples which have to be coded. In particular, if all the channels are idle, no digit pulses at all will be transmitted, as will appear later. For timing purposes at the receiver, a periodic timing wave of frequency 1 megacycle per second is required, and this wave has to be synchronised with a corresponding timing wave at the transmitter. It would be possible, but inconvenient, to generate or synchronise the timing wave at the receiver by means of the synchronising pulses. Accordingly, as will be explained more fully later, it is preferred to transmit from the transmitter a train of timing pulses spaced ½ microsecond apart and having an amplitude less than the minimum amplitude which a digit pulse can assume, so that they can be distinguished from the digit pulses or synchronising pulses at the receiver. It is further arranged at the transmitter that when a digit pulse or synchronising pulse is transmitted, the corresponding timing pulse is suppressed. It will thus be seen that by this arrangement, a continuous train of pulses spaced ½ microsecond apart is transmitted to the receiver, in which any digit pulse not present is replaced by a timing pulse.

The four possible voltage amplitudes of each digit pulse are preferably arranged to differ by a fixed voltage $E$, and the actual amplitude values chosen for the various pulses already mentioned will preferably be ½ $E$ for the timing pulses; 1½ $E$, 2½ $E$, 3½ $E$, 4½ $E$ for the four amplitude values of the digit pulses; and 5½ $E$ for the synchronising pulses. Furthermore, in order to obtain the greatest possible discrimination against the effects of noise, the critical amplitude levels used in the decoding device at the receiver for distinguishing between the four digit amplitudes are set to correspond to the four values $E$, $2E$, $3E$ and $4E$. Thus no response is obtained for any amplitude less than that corresponding to $E$, so the decoding device does not respond to the timing pulses; it will also indicate the digit pulse values 1, 2, 3 and 4, in response to applied pulses having amplitudes lying respectively between $E$ and $2E$; $2E$ and $3E$; $3E$ and $4E$; and greater than $4E$. By this arrangement the greatest possible discrimination against noise is obtained, since a noise voltage of either sign exceeding ½ $E$ is required to cause the decoding device to operate incorrectly.

The manner in which the code is arranged is indicated in Fig. 1. The input speech wave is sampled in such manner as effectively to obtain short amplitude modulated sample pulses, the amplitudes of which are proportional to the corresponding instantaneous speech wave voltage, and are positive or negative according as the speech wave voltage is positive or negative. Thus the pulse amplitude is zero when the speech wave voltage is zero. The amplitudes of both positives and negative sample pulses are quantised into 40 equally spaced values, thus producing 81 quantised steps, including zero. Before quantising, the speech wave, or the sample pulses produced from it, are preferably passed through a logarithmic amplifier according to the usual practice, in order to reduce the quantising distortion for the smaller amplitudes.

Fig. 1 shows how the code is arranged for negative voltages of the input speech waves. Graph A represents a range of negative sample pulse voltage amplitudes ranging from zero to $-V$, where $\pm V$ is the maximum amplitude range covered by the speech wave. The lengths of the forty equally spaced ordinates represent the forty corresponding negative quantised values.

In graph B the horizontal lines is divided into 41 parts by short vertical strokes and in these parts are represented the digit pulse combinations for the respective quantised values of graph A, including zero value. The digit pulse combination is a combination of two pulses but in some cases one of the pulses is zero. In that case the zero pulse is replaced by a corresponding timing pulse (shown dotted) in place of it.

The pulse combination represents the quantised value of the input speech wave on a scale of notation with radix 9, the amplitudes of the pulses of the pulse combination being regarded as digits of a number expressed in radix 9.

For a number of two digits the value represented is $9a+b$ where $a$ is the value of the first digit and $b$ the value of the second digit. $a$ and $b$ can each have 8 integral values $-4 \ldots +4$ or zero.

When two digit pulses are transmitted therefore the first one, identified in graph B by an arrow, represents nine times the relative value of the second one. The representation is complicated by the fact, referred to previously, that an amplitude of $1\frac{1}{2}E$ is the minimum amplitude of a pulse of a combination so that the nine possible amplitudes are $+4\frac{1}{2}E=4$, $+3\frac{1}{2}E=3$, $+2\frac{1}{2}E=2$, $+1\frac{1}{2}E=1$, $0=0$, $-1\frac{1}{2}E=-1$ and so on.

It will be observed that some of the pulses are positive and some are negative and the addition $9a+b$ must therefore be performed algebraically to arrive at the correct quantised value represented.

Some of the pulse combinations are numbered to facilitate comparison with the ordinates of graph A to which they correspond.

The amplitudes of all the pulses are shown approximately to scale in order to indicate the values already stated above. For convenience, the four possible amplitude values of each digit pulse will be called "levels." The difference between two adjacent ordinates of graph A will be called a "step"; each level of the second digit pulse then corresponds to one step and each level of the first digit pulse corresponds to 9 steps.

The ordinates 1 to 4 of graph A are indicated by the presence of the second digit pulse alone, with the corresponding levels $-1$ to $-4$, which represent 1 to 4 steps, respectively. For ordinate 5, the first digit pulse appears with level $-1$ (corresponding to $-9$ steps) and the second digit pulse appears with level $+4$ corresponding to $+4$ steps, the total indication being $9(1-1)+4=-5$ steps. For the next eight ordinates up to 13, the first digit pulse remains unchanged, and the second digit pulse appears successively with levels $+3$, $+2$, $+1$, $0$, $-1$, $-2$, $-3$, and $-4$. For 14 the first digit pulse appears with level $-2$ (corresponding to $-18$ steps) and the second digit pulse appears with level $+4$, and the same series of changes is then repeated up to 22. The first digit pulse appears at level $-3$ for ordinate 23, and $-4$ at ordinate 32, the second digit passing through all the levels from $+4$ to $-4$ for the intermediate ordinates. The last ordinate 40 is given by the first pulse at level $-4$ (corresponding to $-36$ steps) and the second pulse also at level $-4$ making up $-40$ steps altogether.

The coding for positive quantised values of the input speech wave can be deduced from Fig. 1, since for positive values, both digit pulses have signs opposite to those indicated in graph B, but they have the same amplitude as those shown.

The operation of the transmitter and of the receiver of the system will first be described with reference to the block schematic circuits of Figs. 2 and 3, respectively, and then detailed circuits of certain of the elements of these figures will be described.

Figure 2:
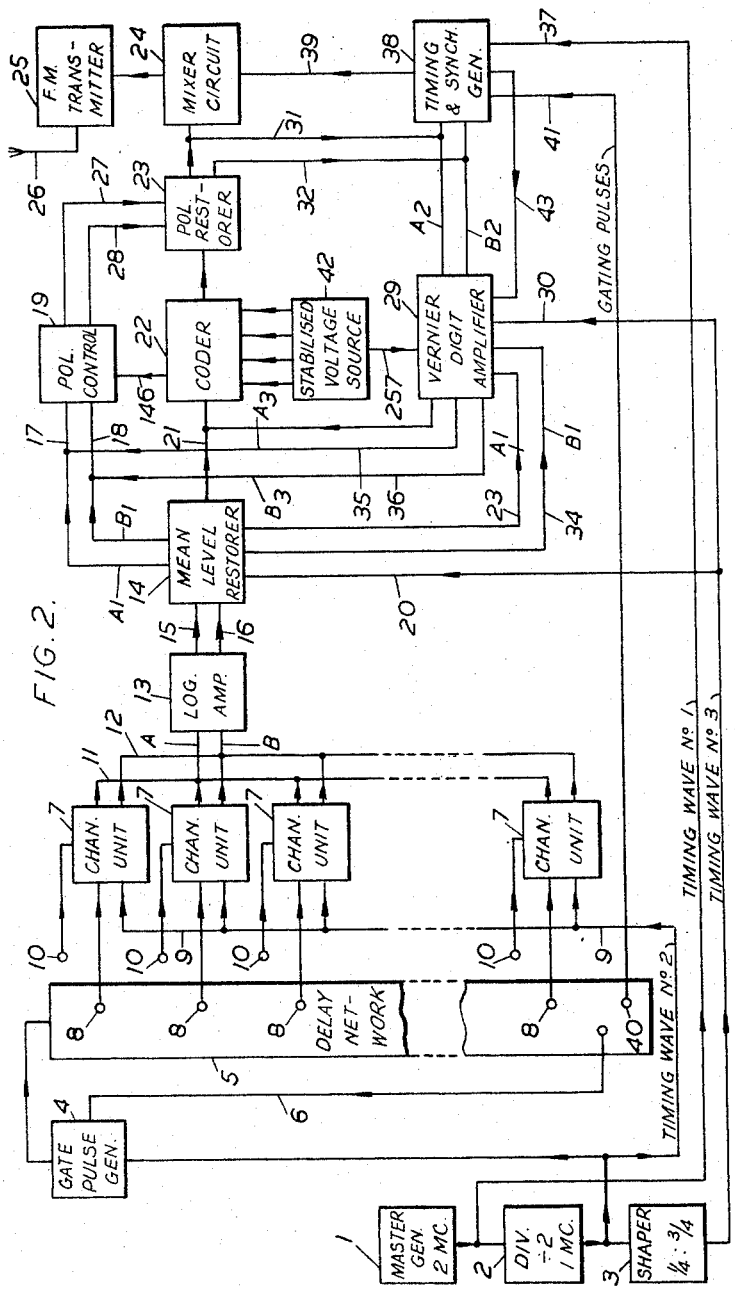

The transmitter of the system is shown by the block schematic circuit of Fig. 2. The timing of the whole system is controlled by a crystal-controlled master generator 1 which generates a wave of frequency 2 megacycles per second which is converted by known methods into a train of rectangular pulses of alternately positive and negative polarity, each of the same duration, namely $\frac{1}{4}$ microsecond. This train of pulses will be called "timing wave No. 1." The pulses are supplied to a frequency divider 2 which divides by two and produces a train of equal positive and negative rectangular pulses of duration $\frac{1}{2}$ microsecond, which will be called "timing wave No. 2." This wave is supplied to a shaping device 3 which produces a train of positive pulses of $\frac{1}{4}$ microsecond duration with a repetition period of 1 microsecond. This train of pulses will be called "timing wave No. 3."

Timing wave No. 2 from the output of the divider 2 is also supplied to a gate pulse generator 4 which includes a dividing circuit which divides by 120, and produces at its output a train of positive gating pulses of duration 1 microsecond, which will be repeated at a frequency of $8\frac{1}{3}$ kilocycles per second. This dividing circuit may, of course, have any number of separate dividing stages in cascade, each of which divides by a convenient small number. The gating pulses are supplied to a delay network distributor 5 used for gating the speech waves corresponding to the 119 channels of the system. The dividing circuit 4 may be stabilised, if desired, by applying thereto over conductor 6 pulses from a suitable tapping point near the lower end of the delay network 5.

The 119 channel units 7 are all alike, and only the first three and the last one are shown. Each is connected to a corresponding tapping point 8 on the delay network 5, such tapping points being spaced at distances corresponding to a delay of 1 microsecond. Timing wave No. 2 is also supplied to each of the channel units 7 over conductor 9 and is so phased that a $\frac{1}{2}$ microsecond positive pulse arrives at each channel unit approximately centrally during the period of the corresponding 1 microsecond gating pulse from the delay network 5. The channel gating arrangements are similar to those described in U.S. Patent 2,462,111 and British Patent 635,472.

The corresponding modulating input speech wave is applied to a terminal 10 of each channel unit 7. The circuit of a channel unit is described in detail below with reference to Fig. 4.

From the output of each channel unit 7 there appear simultaneously two negative pulses of $\frac{1}{2}$ microsecond duration in response to the simultaneous reception of a gating pulse from the delay network 5 and a positive $\frac{1}{2}$ microsecond pulse from timing wave No. 2. The two negative output pulses appear on separate output conductors 11 and 12 and will be called the A pulse and the B pulse, respectively. When the modulating input voltage applied to terminal 10 is zero, both pulses are of the same amplitude $a$. If the input voltage is negative the A pulse will have a negative amplitude $(a+x)$ and the B pulse will have a negative amplitude $(a-x)$, where $x$ is proportional to the magnitude of the applied voltage. If the input voltage is positive then the amplitudes of the A and B pulses are interchanged.

The A and B pulses from any one channel are coincident in time, but the pairs of A and B pulses from different channels appear at different times determined by the corresponding gating pulses. Thus the A and B pulses from all the channels are respectively supplied over separate conductors to two corresponding amplifiers contained in the circuit 13, each amplifier having a logarithmic characteristic, for compressing the amplitude variations of the A and B pulses in order to reduce the quantising error for small values of $x$, according to known practice. The A and B pulses from the output of the amplifiers 13 are applied to a mean level restorer circuit 14 over conductors 15 and 16. The circuit 14 is described in detail later with reference to Fig. 5, and combines the A and B pulses in such a manner as to remove the constant part $a$ of the amplitude, retaining only a portion proportion to $x$ and having a sign corresponding to the sign of $x$. The circuit 14 has two output conductors 17 and 18 on which respectively appear two pulses $A_1$ and $B_1$ of opposite sign but equal amplitude proportional to $x$. If the input voltage is negative then pulse $A_1$ is negative and pulse $B_1$ is positive. If the input voltage is positive then the signs of the pulses $A_1$ and $B_1$ are interchanged. The conductors 17 and 18 are applied to a polarisation control device 19, the function of which will be explained later.

Timing wave No. 3 is also applied over conductor 20 to the mean level restorer circuit 14 for the purpose of trimming the $A_1$ and $B_1$ pulses to a duration of ¼ microsecond in order to reduce the effects of crosstalk from the pulses of adjacent channels.

The $A_1$ and $B_1$ pulses have equal amplitudes proportional to the input speech wave amplitude at the time defined by the ¼ microsecond timing pulse applied over conductor 20: they therefore represent a sample of the input speech wave, and will be called "sample pulses" for convenience. The $A_1$ and $B_1$ pulses are coincident in time.

The pulse $A_1$ or the pulse $B_1$, whichever is negative, is also applied over conductor 21 to a coder 22 which generates the pair of code pulses corresponding to the sample of the speech wave produced by the channel unit.

It will be noted from graph B, Fig. 1, that when the applied input voltage V is negative, the first digit pulse of each pair to be transmitted is always negative; also it was stated above, that when V is positive, all the digit pulses are reversed in sign. Thus, when V is positive the first digit pulse of each combination will be positive. This arrangement enables the coder 22 to be designed so that it covers only the 40 steps corresponding to one sign of V. If V has the other sign, it is only necessary to reverse the signs of all the pulses set up by the coder. This operation is controlled by the polarisation control device 19 which operates the polarisation restorer circuit 23 connected to the output of the coder 22. The circuit 23 decides the final signs of the output digit pulses. These digit pulses are supplied from the circuit 23 through a mixer circuit 24 to a transmitter 25 for frequency modulation of a carrier wave of appropriate frequency which is radiated from an antenna 26.

Considering first the production of the first digit pulse, it has already been stated that the coder is supplied over conductor 21 with a negative pulse whose amplitude is proportional to the input voltage. If this amplitude is greater than that which corresponds to ordinate 4 of graph A, Fig. 1, a positive first digit pulse will be delivered by the coder 22 to the polarisation restorer circuit 23, the amplitude of the digit pulse having one of the four levels determined by the input voltage according to graph B, Fig. 1. It has already been explained that $A_1$ and $B_1$ pulses of opposite signs are supplied to the polarisation control device 19 over conductors 17 and 18 respectively. If the device 19 finds a negative pulse on conductor 17, corresponding to a negative input voltage, it applies a negative pulse to the polarisation restorer circuit 23 over conductor 27. This causes the circuit 23 to supply a negative digit pulse to the mixer circuit 24. If, however, the device 19 finds a negative pulse on conductor 18, corresponding to a positive input voltage, it now applies a negative pulse over conductor 28 to the polarisation restorer circuit 23 and causes it to supply a positive digit pulse to the mixer circuit 24. Thus the first digit pulse is always negative if the input voltage is negative, and always positive if it is positive, as required by the code shown in graph B, Fig. 1.

In order to produce the second digit pulse, the vernier digit amplifier 29 is used. This amplifier is normally blocked, but is unblocked for ¼ microsecond at the right time during the channel period concerned by the corresponding positive pulse of the timing wave No. 3 applied over conductor 30. The polarisation restorer circuit 23 supplies the first digit pulse, just set up, over conductor 31 to the amplifier 29, and with the same sign as it is supplied to the mixer circuit. The circuit 23 also supplies the same digit pulse with the opposite sign over conductor 32 to the amplifier 29. The digit pulses supplied over conductors 31 and 32 will be denoted $A_2$ and $B_2$ respectively. The sample pulses $A_1$ and $B_1$ (from one of which the first digit pulse was derived) are also supplied from the mean level restorer circuit 14 to the vernier digit amplifier 29 over conductors 33 and 34 respectively. From what has been explained, it will be clear that pulses $A_2$ and $B_2$ have the same signs as pulses $A_1$ and $B_1$ respectively. The amplifier 29 derives from the $A_2$ and $B_2$ pulses corresponding comparison pulses with the same signs as $A_2$ and $B_2$, respectively, and with amplitude equal to that which the first digit pulse represents when present alone without the second digit pulse. The amplifier 29 also picks out the positive sample pulse and the positive comparison pulse and subtracts one from the other, and multiplies the amplitude difference by 9; thereby producing a pair of output pulses of equal amplitude but opposite signs called $A_3$ and $B_3$ pulses. If the positive comparison pulse corresponds to the $B_2$ pulse and is of smaller amplitude than the positive $B_1$ pulse, or if it corresponds to the $A_2$ pulse and is of greater amplitude than the positive $A_1$ pulse, then the $A_3$ pulse will be negative and the $B_3$ pulse will be positive. For the other two possible conditions the signs of the $A_3$ and $B_3$ pulses will be interchanged. The $A_3$ and $B_3$ pulses are delayed by ½ microsecond in the amplifier 29, and are respectively applied over conductors 35 and 36 to the input conductors 17 and 18 of the polarisation control device 19, in order to determine the sign of the second digit pulse at the output of the polarisation restorer circuit 23, as described for the first digit pulse. Whichever of the pulses $A_3$ or $B_3$ is negative is also applied (after ½ microsecond delay) to the input conductor 21 of the coder 22, which it operates a second time in the same way as before to produce the second digit pulse. The coder does not operate a third time because the ¼ microsecond timing pulse applied over conductor 30 will have disappeared, so that the vernier digit amplifier 29 will be blocked. The second digit pulse is thus applied to the mixer circuit 24 half a microsecond after the first digit pulse.

It remains to describe the arrangements for transmitting the synchronising and timing signals. The timing wave No. 1, consisting of a train of positive pulses of ¼ microsecond duration with a repetition frequency of 2 megacycles per second, is applied over conductor 37 to the timing and synchronising generator 38, the output of which is connected over conductor 39 to the mixer circuit 24. This generator includes a timing amplifier through which the pulses are normally passed, and they emerge with an amplitude equal to ½E, as indicated in graph B, Fig. 1. However, conductors 31 and 32 are also connected to the generator 38, and whichever of the $A_2$ and $B_2$ pulses is negative acts as a blocking pulse, so that when a digit pulse is present, the corresponding timing pulse is suppressed, as already explained. It is evidently necessary to phase the timing wave No. 1 so that the timing pulses occur at the same times as the digit pulses.

The generator 38 also includes a second normally blocked amplifier to which gating pulses from the tap 40 of the delay network 5 corresponding to channel 120 (which is not used as a speech channel) are supplied over conductor 41. Timing wave No. 1 is also supplied to this amplifier, so that two ¼ microsecond pulses are passed through the second amplifier during the synchronising period, but they emerge with amplitude 5½E so that they can be recognised at the receiver, as already explained.

Thus it will be seen that there will be supplied to the transmitter 25 from the mixer circuit 24 two ¼ microsecond pulses of amplitude 5½E spaced ½ microsecond apart during the synchronising period No. 120, and in general a pair of digit pulses each of ¼ microsecond duration and spaced apart by ½ microsecond during each of the 119 channel periods, such digit pulses having one of the four amplitudes 1½E, 2½E, 3½E or 4½E, according to the code; if however, a digit pulse is absent, its place is taken by a timing pulse of duration ¼ microsecond and amplitude ½E. The receiver thus receives a continuous train of pulses of various amplitudes but spaced apart by a constant interval of ½ microsecond.

Although the pulses supplied to the transmitter 25 are all of duration ¼ microsecond, it is desirable, in order to reduce the frequency bandwidth occupied by the system, to widen out all the pulses to nearly ½ microsecond and give them substantially a half-sinusoidal shape. This can be done by known circuit arrangements (not indicated) in the transmitter 25.

As will be explained later, the coder 22 requires for its operation four stabilised limit voltages which are provided by the stabilised voltage source 42 which also supplies a fifth stabilised voltage required by the vernier digit amplifier 29. This amplifier derives a further stabilised voltage from the timing and synchronising generator 38 over conductor 43. This will be made clear when the detailed circuits are explained.

Figure 3:
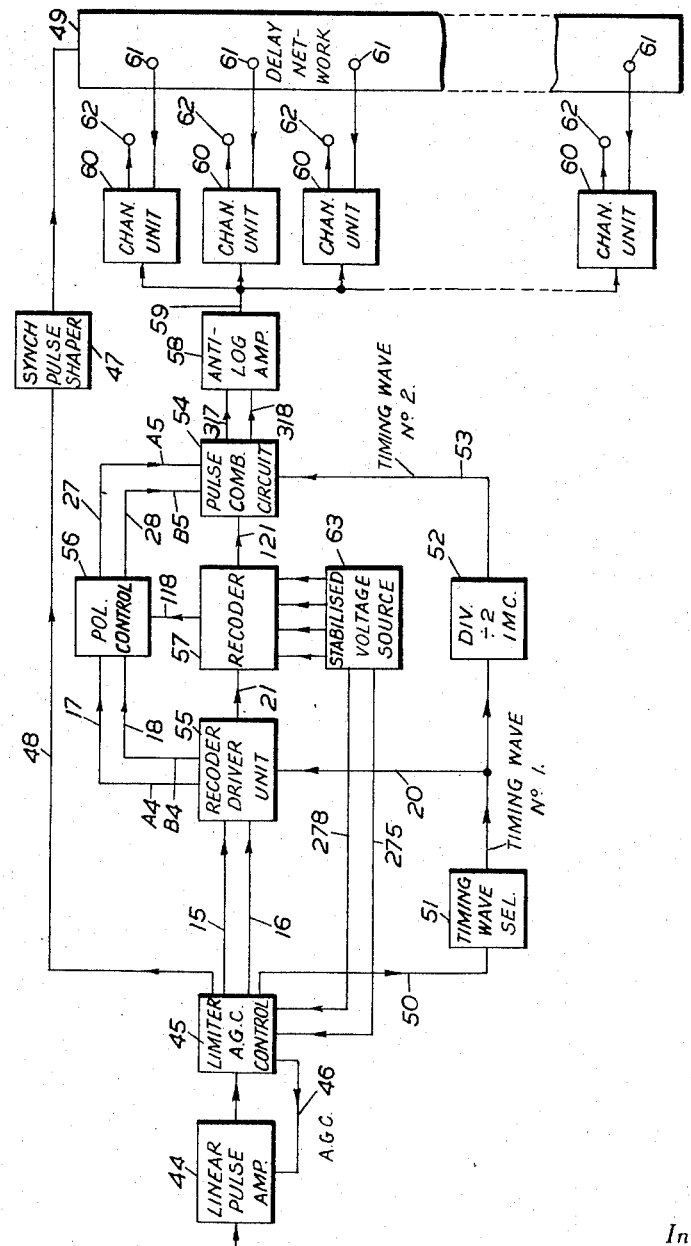

Fig. 3 shows a block schematic circuit diagram of the receiver for decoding the digit pulses produced by the transmitter circuit shown in Fig. 2. The frequency-modulated carrier wave is received and demodulated by means of conventional arrangements including a discriminator circuit (not shown) from which are obtained the digit pulses which are supplied to a linear pulse amplifier 44, one or more stages of which are provided with automatic gain control arrangements. The digit pulses at the output of the amplifier 44 will be of both signs, and are applied to a limiter and automatic gain control circuit 45. The circuit 45 generates an automatic gain control voltage which is applied over conductor 46 to one or more stages of the amplifier 44, and adjusts the gain until the synchronising pulses at the output of the circuit 45 have a specified amplitude, by means of which the relative levels of the received digit pulses are set. The circuit 45 also includes means for selecting the synchronising pulses and applying them to a shaper circuit 47 over a conductor 48. Circuit 47 produces a rectangular gating pulse of 1 microsecond duration in response to each pair of synchronising pulses. The gating pulses are applied to a delay network distributor 49 (similar to 5, Fig. 2) which is used for gating the receiving channel units.

The pulses present in the circuit 45 are already of the required frequency to serve as a timing wave at the receiver, but they will be accompanied by noise. They are therefore applied over conductor 50 to a timing wave selector circuit 51, which consists of one or more sharply resonant circuits arranged in cascade and tuned to a frequency of 2 megacycles per second, whereby a sine-wave of frequency 2 megacycles per second of substantially constant amplitude, and substantially free from noise, is derived from the received pulses, which, as already explained, are of various amplitudes, but are repeated at regular intervals of ½ microsecond. The sharply resonant circuits are followed by a limiter in which the sine-wave is converted into a train of rectangular pulses of ¼ microsecond duration, which will be the same as timing wave No. 1 of Fig. 2. This wave is applied to a dividing circuit 52 similar to the divider 2 of Fig. 2, which divides by 2 and includes shaping means for producing a train of alternately positive and negative rectangular pulses of duration ½ microsecond, which train is the same as timing wave No. 2 of Fig. 2. This timing wave No. 2 is applied over conductor 53 to a pulse combining circuit 54. The timing wave No. 3 is not required in Fig. 3.

The limiter circuit 45 is also provided with a balanced output arrangement connected to two output conductors 15 and 16. The arrangement is such that if a received digit pulse is negative, a corresponding negative pulse is delivered to conductor 15, and if the received digit pulse is positive, a corresponding negative pulse is delivered to conductor 16 instead. The conductors 15 and 16 are connected to a recoder driver unit 55 which is substantially the same as the mean level restorer circuit 14 of Fig. 2. The same detailed circuit (Fig. 5) serves for the mean level restorer 14 and the recoder driver unit 55 and hence the input and output conductors connected to the latter have the same reference numerals as those for the circuit 14 in Fig. 2. The unit 55 supplies in response to each digit pulse a pair of pulses respectively over conductors 17 and 18 to a polarisation control device 56 exactly similar to the device 19 of Fig. 2. These pulses will be called $A_4$ and $B_4$ respectively and are of the same nature as the $A_1$ and $B_1$ pulses of Fig. 2. The unit 55 is supplied with the timing wave No. 1 from the selector 51 over conductor 20 so phased that each pair of digit pulses synchronises with a pair of ¼ microsecond pulses of the timing wave, for trimming the $A_4$ and $B_4$ pulses corresponding to each digit pulse. Whichever of the $A_4$ and $B_4$ pulses is negative is applied to a recoder 57 which differs from the coder 22 of Fig. 2 only in the adjustment, as will be explained later. Positive recoded output pulses corresponding to each pair of received digit pulses are supplied from the recoder circuit 57 to the pulse combining circuit 54 which is controlled by polarisation control pulses $A_5$ and $B_5$ applied over conductors 27 and 28 from the polarisation control circuit 56. The combining circuit 54 adds together the two recoded pulses produced by the circuit 57 in the ratio 9:1 and with the proper signs as determined by the $A_5$ and $B_5$ pulses. The combining circuit 54 is caused to distinguish between the first and second recoded pulses by the timing wave No. 2 which is applied from the divider circuit 52 over conductor 53. The combined pulses at the output of the combining circuit 54 will then be quantised versions of the pulses at the output of the logarithmic amplifier 13 of Fig. 2. They are accordingly applied through an anti-logarithmic amplifier 58, which is connected over conductor 59 to the inputs of all the 119 channel receiving units 60. These units are gated at the proper times by gating pulses from appropriate tapping points 61 of the delay network 49. The reconstituted pulses of each channel are passed through a low pass filter (not shown) in the channel unit, and the recovered speech wave appears at terminal 62. As in the case of Fig. 1, the recoder 57 requires to be supplied with four stabilised voltages provided by a stabilised voltage source 63 generally similar to the source 42 of Fig. 2. This also provides two further stabilised voltages required for the limiter and automatic gain control circuit 45.

It will be realised that the two received synchronising pulses of amplitude 5½E will be applied to the recoder driver unit 55 and will behave like two digit pulses of maximum amplitude, and so will produce an output pulse from the combining circuit 54 having an amplitude of 40 steps. However, during the synchronising period none of the channel units will be operative, so this is immaterial.

Having given a general outline of the operation of the system, the detailed circuits of the more important elements thereof will be described, from which the processes of coding and decoding will be more clearly understood.

The circuits required for the master generator 1, the divider and shaper 2 and 3, and the gate pulse generator 4 of Fig. 2 are all well known. The distribution and synchronising arrangements involving the delay network 5 are similar to those described in U.S. Patent 2,462,111 and British Patent 635,472, already referred to.

Fig. 4 shows the circuit of the channel units 7 of the transmitter, Fig. 2. It consists of a pair of similar valves, 64, 65 arranged as a push-pull amplifier which, however, is biased so as to be normally blocked. The operating high tension source (not shown) for the valves is intended to have its positive terminal connected to terminal 66 and its negative terminal to terminal 67, which should preferably be connected to ground. Numerals 66 and 67 will be used for the terminals for the high tension source in all subsequent figures. The speech or other input wave to be transmitted is applied to the input terminal 10 connected to one end of the primary winding of a transformer 68, the other end being connected to ground. The secondary winding is connected between the control grids of the two valves, and has a centre tap connected to ground.

The cathodes of the valves 64 and 65 are connected together and are biased positively beyond the cut-off point by connection to the junction point of the resistors 69 and 70 connected in series between terminals 66 and 67. Equal load resistors 71 and 72 are provided for the anode circuits of the valves 64 and 65 and the anodes are respectively connected to the output conductors 11 and 12 (shown also in Fig. 2) through capacitors 73 and 74 and isolating rectifiers 75 and 76. The amplifier comprising the valves 64 and 65 is periodically unblocked by a gating valve 77, the cathode of which is biased positively by a conventional resistor-capacitor network 78 so as to block the valve. The anode is connected to terminal 66 through a load resistor 79, and to the cathodes of the valves 64 and 65 through a coupling capacitor 80. The 1 microsecond gating pulses from the tap 8 of the delay network 5 (Fig. 2) are applied to the control grid of the gating valve 77 through a capacitor 81 and resistor 82. The control grid is, however, connected to ground through a rectifier 83 and a resistor 84 of moderate value. A grid leak resistor 85 connects the junction point of elements 81 and 82 to ground.

The rectifier 83 is directed so that it normally shunts to ground the positive gating pulses applied through the capacitor 81, so that they are unable to unblock the gating valve. However, the timing wave No. 2 is applied from conductor 9 over a capacitor 86 to the junction point of elements 83 and 84. As already explained, the timing wave No. 2 consists of alternate positive and negative pulses of ½ microsecond duration, and should be phased so that a positive ½ microsecond pulse occurs symmetrically during the 1 microsecond interval occupied by the gating pulse. The ½ microsecond pulse being applied to the cathode of the rectifier 83 blocks it so that the gating pulse is able to unblock the valve 77 for the period of the ½ microsecond timing pulse, and a negative pulse of ½ microsecond duration is then transmitted to the cathodes of the valves 64 and 65, thereby unblocking them for a period of ½ microsecond. The amplitude of the last-mentioned pulse should be so chosen that when the valves 64 and 65 are unblocked, the control grids are biased to the centre of the straight portion of the anode current-grid voltage characteristic curve. It will thus be seen that if the input voltage at terminal 10 is zero, each of the valves 64 and 65 will generate a negative output pulse of duration ½ microsecond during each 1 microsecond period of the channel concerned. The rectifiers 75 and 76 should be directed so as to pass these negative pulses respectively to the output conductors 11 and 12. These are the pulses already designated A and B, and have equal amplitudes $a$ when the input voltage is zero.

It will be supposed that the transformer 68 has been connected so that when the input voltage at terminal 10 is negative, a positive potential is applied to the control grid of the valve 64 and an equal negative potential to the control grid of the valve 65. The amplitude of the A pulse delivered to conductor 11 will then be increased to $a+x$ and that of the B pulse delivered to conductor 12 will be decreased to $a-x$, where $x$ is proportional to the input voltage. If the input voltage is positive, it follows that the amplitude of the A and B pulses will be $a-x$ and $a+x$, respectively, the pulses, however, still being negative.

The leak resistor 87 connected between the junction point of elements 74 and 76 and ground is provided as a return path for the rectifier 76. Two resistors 88 and 89 together equal to resistor 87 connect the junction point of elements 73 and 75 to ground, for a similar reason. A terminal 90 connected to the junction point of resistors 88 and 89 is provided for the application of a supervisory signal voltage which should be positive and sufficient to block the rectifier 75, thereby suppressing the A pulses. The suppression of the A pulses thus indicates a supervisory signal, and as will be explained later, the corresponding channel unit at the receiving end is provided with a rectifier circuit and relay which responds to this condition.

Fig. 5 shows the details of the mean level restorer circuit 14 of Fig. 2, and also of the recoder driver unit 55 of Fig. 3. For the present the operation at the transmitter only will be described. As shown in Fig. 5, the mean level restorer circuit comprises two similar pentode valves 91 and 92, arranged as a push-pull amplifier.

The negative A and B pulses from the logarithmic amplifiers 13 of Fig. 2 are applied respectively over conductors 15 and 16 through transformers 93 and 94 to the control grids of the valves 92 and 91. The anodes of these valves are connected to opposite ends of the primary winding of an output transformer 95, this winding having a centre tap connected to the positive high tension terminal 66. The secondary winding also has a centre tap connected to ground, and the ends of the winding are connected to the conductors 17 and 18 (shown also in Fig. 2) leading to the polarisation control device 19, Fig. 9. The ends of the said secondary winding are also connected to the conductors 33 and 34 which, as shown in Fig. 2, lead to the vernier digit amplifier 29, Fig. 11.

The ends of the secondary winding of transformer 95 are also connected through rectifiers 96 and 97 to the common output conductor 21 which is connected to the coder 22, Fig. 6.

The valves 91 and 92 are provided with cathode bias resistors 98 and 99 which introduce a relatively large amount of negative feedback, so that the gain of each valve is small or zero and remains very stable over a long period. The valves are at the same time biased so as to be cut off by the suppressor grids, but the timing wave No. 3 (consisting of positive ¼ microsecond pulses) is applied to the suppressor grids over conductor 20 to unblock the valves during the centre of the period of each pair of ½ microsecond A and B pulses applied to the control grids, for trimming these pulses, as already explained.

The secondary windings of the transformers 93 and 94 each have one terminal connected to a tapping point on the corresponding cathode resistor 99 or 98, to provide appropriate bias for the control grids, and the transformers are poled in such manner that the pulses applied to the control grids are positive, it being remembered that the A and B pulses are always negative. As already explained, when the input voltage applied to the channel unit is zero, the A and B pulses will have the same amplitude $a$, and this amplitude is chosen in relation to the effective control grid bias of the valves 91 and 92 so that when the valves are unblocked by the trimming pulse, the total control grid potential corresponds to the lower end of the straight portion of the anode current-grid voltage characteristic of the valves. When the A and B pulses both have amplitude $a$, it is evident that owing to the balance of the windings of the transformer 95, there will be no potential at either end of the secondary winding. For a negative input voltage, however, the A and B pulses will have respective negative amplitudes $a+x$ and $a-x$, as already explained, and it will be evident that the potentials generated respectively at the terminals of the secondary winding will be equal, and proportional to the difference between the amplitudes of the A and B pulses, that is, proportional to $x$; and will have opposite signs. It will be assumed that the transformer windings are so poled that when the A pulse is of greater amplitude than the B pulse, indicating that the speech wave voltage is negative, a negative potential appears on conductors 17 and 33. It will be evident from what has been explained that when the speech wave voltage is positive, the A pulse will be of smaller amplitude than the B pulse, and so a negative potential now appears on conductors 18 and 34.

The pulses appearing on conductors 17 and 18 are the pulses which have been already denoted as $A_1$ and $B_1$, and will have equal amplitudes proportional to $x$, and will be of opposite signs. Whichever of these pulses is negative gets through one of the rectifiers 96 and 97, and is supplied to the coder over conductor 21, as already explained.

It should be mentioned that owing to the presence of stray capacities in the circuit, the windings of the transformers 93, 94 and 95 are liable to form oscillatory circuits which may "ring" on the application of pulses. This may be avoided, if necessary, by connecting damping resistors (not shown) across the primary and secondary windings. Transformers such as 93 and 94 which are transmitting unidirectional pulses could alternatively be damped by shunting them with rectifiers (not shown) poled so as to be blocked by the pulses.

In several of the circuits which will be described below, similarly arranged transformers are shown. The windings of such transformers may, if necessary, be damped in like manner with appropriate resistors or rectifiers.

The details and operation of the coder 22 will now be explained with reference to Fig. 6, which also includes a block representing the stabilized voltage source 42 described in detail in Fig. 8. The coder 22 shown in Fig. 6 comprises four exactly similar coding stages 100, 101, 102 and 103 which comprise single stroke multivibrators each of which is arranged as shown in Fig. 7. The conductor 21 (Fig. 6) is connected to the control grid of an amplifier valve 104 arranged as a cathode follower, and the upper end of the cathode load resistor 105 is connected in common to the input terminals 106 of the four coding stages through capacitors 107 to 110 and rectifiers 111 to 114. The negative pulse of amplitude proportional to $x$ supplied by the mean level restorer circuit 14 (Figs. 2 and 5) to conductor 21 and constituting a sample of the input speech wave, thus causes a negative pulse of proportional amplitude to be applied to all the rectifiers 111 to 114 simultaneously through the valve 104. These rectifiers are however, all initially blocked by corresponding positive potentials derived from terminals 115 to 118 of the stabilised voltage source 42, these potentials having respectively the values $5e$, $14e$, $23e$ and $32e$, where $40e$ is the maximum amplitude of the pulse at the cathode of the valve 104. When a given pulse has an amplitude exceeding one of the four first-mentioned values, the corresponding rectifier and also the preceding ones of the series (if any) will be unblocked and the corresponding coding stages will be triggered. Thus, for example, if the applied pulse amplitude is $20e$, the stages 100 and 101 will be triggered but not 102 or 103. The triggering of any coding stage causes it to generate a rectangular pulse of ½ microsecond duration which is delivered to the output terminals 119 and 120 in such manner that terminal 120 is positive to terminal 119. The output terminals of the four coding stages are connected in series aiding between ground and the output conductor 121 leading to the polarisation restorer circuit 23 (Figs. 2 and 10). A positive digit pulse having amplitude equal to the sum of the amplitudes of all the pulses generated by the coding stages which have been triggered will thus appear on conductor 121. Terminals 119 and 120 of the respective coding stages are shunted by rectifiers 122 to 125 directed as shown so that any coding stage which has not been triggered will be by-passed by the pulses produced by the other stages, thus avoiding any risk of unwanted triggering of such stages. These rectifiers also act as damping loads to prevent the output circuits of the coding stages from ringing. The reason for the particular choice of the four potentials produced by the source 42 at terminals 115 to 118 can be understood by reference to Fig. 1. It will be noted that the first digit pulse at a level 1½E appears when the amplitude has reached five steps, and it appears at successively increasing levels when the amplitude has reached 14, 23 and 32 steps respectively. Thus for the production of the first digit pulse, the blocking bias potentials for the rectifiers 111 to 114 evidently have to be in the ratios 5:14:23:32.

It was explained with reference to Fig. 1, that the digit pulse amplitude levels are given by 1½E, 2½E, 3½E and 4½E. These differ by E, but the first level is 1½E. Accordingly it is necessary that the second, third, and fourth coding stages 101 to 103 should each generate a pulse of amplitude E, while the first coding stage 100 must generate a pulse of larger amplitude 1½E. The amplitude of the pulse generated by any coding stage is determined by a stabilised voltage determined by a gas discharge tube 126 and two resistors 127 and 128 connected in series between the high tension terminals 66 and 67. The junction point of resistors 127 and 128 is connected to a limiter terminal 129 of the first coding stage 100 through a rectifier 130, and the junction between the tube 126 and the resistor 127 is connected to the limiter terminal 129 of each of the other coding stages 101, 102 and 103 through rectifiers 131, 132 and 133 respectively, each rectifier having its cathode connected to the corresponding limiter terminal 129.

The gas discharge tube 126 effectively fixes the potential applied to the rectifiers 131, 132 and 133 at a potential P volts less than that of the high tension source, the value of P depending on the type of gas tube used. The rectifier 130 must, however, be biased at a somewhat lower voltage, and the values of the resistors 127 and 128 should be so chosen that the potential applied to the rectifier 130 is 1½P less than that of the high tension source. As will be explained with reference to Fig. 7, by this arrangement the amplitude of the pulses generated by the first coding stage will be fixed at 1½E volts, while the amplitude of the pulses generated by each of the other coding stages will be fixed at E volts.

Fig. 7 shows the circuit of each of the coding stages of Fig. 6. It consists of two valves 134, 135 arranged as a conventional single-stroke multivibrator. The anode of valve 134 is connected to terminal 66 through a load resistor 136 and to the control grid of valve 135 through a capacitor 137. The anode of valve 135 is connected to terminal 66 through the primary winding of an output transformer 138, and to the control grid of the valve 134 through a capacitor 139. The secondary winding of the transformer 138 is connected to the output terminals 119 and 120. The cathode of the valve 135 is biased positively by connection to the junction point of two resistors 140 and 141 connected in series between terminals 66 and 67 so that this valve is normally cut off. The cathode of the valve 134 is connected directly to ground and the control grids of the valves are connected to ground through the usual leak resistors 142 and 143. These resistors are shunted by rectifiers 144 and 145, which are oppositely directed so that they do not affect the triggering of the multivibrator by the negative pulses applied at terminal 106, but they accelerate the recovery of the circuit by short circuiting the leak resistors as soon as the potential of the control grids is on the point of changing sign. The values of the resistors and capacitors should be chosen so that the pulses generated when the circuit is triggered have a duration of ½ microsecond.

The limiter terminal 129 is connected to the anode of the valve 135. Before triggering, this valve is cut off, so that the anode voltage is equal to that of the high tension source. In the case of the first coding stage, the rectifier 130 (Fig. 6) will be blocked in this condition. When the circuit is triggered, the valve 135 conducts and the anode voltage falls rapidly until it equals the potential of the junction point of resistors 127 and 128 (1½P volts). The rectifier 130 then conducts and prevents the anode potential from falling any further. The amplitude of the negative pulse so generated at the anode is thus rigidly limited to the desired value 1½P. In the case of the other coding stages the limiting action is similar, except that the limiting amplitude is P volts instead of 1½P volts.

The transformer 138 should be poled so that when the multivibrator is triggered, terminal 120 produces a positive potential with respect to terminal 119. If it be assumed that the voltage amplification ratio of the polarisation restorer circuit 23 is $y$, and that the voltage step-up ratio of the transformer 138 is $z$, then in order to obtain the desired four levels 1½E, 2½E, 3½E, and 4½E for the pulses which are transmitted to the mixer circuit 24, Fig. 2, it will evidently be necessary to choose $yz=E/P$.

The conductor 146 shown dotted in Fig. 7 is connected to terminal 129 of the first coding stage 100 only of the coder as shown in Fig. 6, and connects this coding stage to the polarisation control device, Fig. 9. It will be clear from what has just been explained that a negative pulse will be applied to conductor 146 when the multivibrator of the first coding stage 100 is triggered. Thus, if the pulse at the cathode of the valve 104 (Fig. 6) is of sufficient amplitude to operate at least the first stage of the coder, so that a digit pulse is produced, a negative pulse for unblocking the polarisation control device (Fig. 9) will be applied over conductor 146, as will be explained later.

Fig. 8 shows details of the stabilised voltage source 42 shown in Figs. 2 and 6. It comprises a gas discharge tube 147 connected in series with a resistor 148 between the high tension terminals 66 and 67. A chain of four resistors 149, 150, 151 and 152 is connected across the tube 147. Four similar valves 153 to 156 are arranged as cathode followers with their anodes connected directly to terminal 66 and their cathodes through four corresponding equal resistors 157 to 160 to ground. The control grids are respectively connected to the left-hand ends of resistors 149 to 152. Terminals 115 to 118 are connected respectively to the cathodes of the valves 153 to 156 through high resistors 161 to 164 shunted by rectifiers 165 to 168. A terminal 169 (the purpose of which is described later) is connected in a similar manner through a resistor 170 shunted by a rectifier 171 to a tapping point on resistor 157.

The resistors 150 to 152 should each have a resistance equal to some convenient value R, while the resistance of resistor 149 should be $5R/9$. Then if $32e/k$ is the potential across the tube 147, where $k$ is the voltage transformation ratio of the cathode follower circuit, the potentials of the cathodes of the valves 153 to 156 will be $5e$, $14e$, $23e$ and $32e$ as required. The tapping point on the resistor 157 should be that corresponding to a potential of $4e$. The ratio $k$ depends on the value chosen for the resistors 157 to 160, and is generally slightly less than 1.

The use of the cathode follower valves enables the desired potentials to be conveniently produced from sources having a very low effective internal impedance, so that the potentials will not be appreciably changed when current is drawn from any of the terminals 115 to 118 or 169. In order that the pulses applied to the coding stages in Fig. 6 shall not thereby be effectively shunted away, the high series resistances 161 to 164 and 170 are provided in Fig. 8. The rectifiers shunting these resistances are provided to prevent the capacitors 107 to 110 of Fig. 6 from becoming charged. These rectifiers are directed, as shown, to be normally blocked by the positive potentials of the corresponding cathodes of the valves 153 to 156.

In practice, of course, the value of $e$ will be determined by the maintaining voltage of the type of gas discharge tube 147 which is selected. Thus, for example, this maintaining voltage might be 80 volts, in which case $32e=80$ volts, or $e=2½$ volts. The gain of the elements 7, 13 and 14 (Fig. 2) should in this case be so chosen that the maximum amplitude of a sample pulse at the input to the coder 22 is $40e=100$ volts.

As stated above with reference to Fig. 2, the first digit pulse from the coder 22, Fig. 7, is applied to the polarisation restorer circuit 23, Fig. 10, which is also affected by the polarisation control device 19, the circuit of which is shown in Fig. 9. The device 19 comprises two pairs of similar valves 172, 173, 174 and 175 arranged as two similar multivibrators, and a bias control valve 176. The anodes of the valves 172 and 173 are respectively connected to terminal 66 through load resistors 177 and 178, and to the control grids of the opposite valves through capacitors 179 and 180. Elements 181 to 184 associated with valves 174 and 175 are respectively the same as elements 177 to 180.

The cathodes of the valves 172 and 174 are connected directly to ground. The cathodes of the valves 173 and 175 are connected directly to the cathode of the valve 176, which is connected to ground through two resistors 185 and 186 connected in series. The anode of the valve 176 is connected to terminal 66 through resistor 187. The control grid of the valve 176 is connected to the junction point of resistors 185 and 186 through a leak resistor 188. The resistors are so proportioned that the drop of potential produced by the cathode current of the valve 176 will bias the valves 173 and 175 beyond the cut-off. Valves 172 and 174 will evidently be in the conducting condition.

The cut-off bias is of such magnitude that neither of the $A_1$ and $B_1$ pulses applied to conductors 17 and 18 is able to trigger the corresponding multivibrator except when a negative pulse is applied from the coder 22 over conductor 146 through the blocking capacitor 189 to the control grid of valve 176. As will be evident from the previous description of the coder circuit, this negative pulse appears whenever an output digit pulse is produced by the coder 22, and it is arranged to reduce the cathode current of the valve 176 and thereby to reduce the cut-off bias of the valves 173 and 175 by such an amount that while these valves are still cut off, it is now possible for one of the multivibrators to be triggered by the $A_1$ or the $B_1$ pulse. This arrangement is for the purpose of preventing the polarisation control device from operating if no output digit pulse is produced by the coder.

It will be noted that it is not necessary to provide the valves 173 and 175 with separate bias valves because the multivibrators are never both operated at the same time.

The conductors 17 and 18 are connected respectively to the control grids of the valves 172 and 174 through isolating rectifiers 190 and 191 directed to pass only negative pulses to these control grids. The anodes of the valves 173 and 175 are respectively connected through capacitors 192 and 193 to the output conductors 27 and 28 connected to the polarisation restorer circuit 23 which is shown in detail in Fig. 10. Leak resistors 194 and 195 are provided as return paths for isolating rectifiers which are shown in Fig. 10.

The polarisation control circuit (Fig. 9) operates as follows:

If the input voltage is negative, the $A_1$ and $B_1$ pulses respectively applied to conductors 17 and 18, are negative and positive, respectively. The $A_1$ pulse thus gets through the rectifier 190 and triggers the left hand multivibrator from the idle condition to the operated condition with the valve 173 conducting, if an unblocking pulse is received from the coder 22 over conductor 146. The multivibrator restores itself after a period depending on the time constants of the associated circuits, and the anode of the valve 173 delivers a negative rectangular pulse to the output conductor 27. The time constants are preferably chosen so that the duration of this pulse is about ½ microsecond.

If, however, the input voltage is positive, the signs of the $A_1$ and $B_1$ pulses are reversed, and this time the $B_1$ pulse on conductor 18 gets through the rectifier 191 and triggers the right-hand multivibrator, provided that it is unblocked, which in like manner delivers a ½ microsecond negative pulse to conductor 28. Thus when the input voltage is negative, a negative pulse appears on conductor 27, and when the input voltage is positive, a negative pulse appears on conductor 28 instead.

It was explained above with reference to Fig. 2 that when the second digit pulse is produced, the vernier digit amplifier 29 operates to apply $A_3$ and $B_3$ pulses to the polarisation control device. These pulses are respectively applied over the conductors 35 and 36 and isolating rectifiers 196 and 197 to the control grids of the valves 172 and 174. These conductors and rectifiers are not used in the polarisation control device 56 at the receiving end (Fig. 3).

The polarisation restorer circuit 23 of Fig. 2 shown in detail in Fig. 10 consists of two similar pentode valves 198 and 199 arranged as an amplifier with a balanced push-pull output. Digit pulses from the coder (Fig. 6) are applied over conductor 121 and capacitor 200 to both control grids in parallel. The cathodes are biased positively by connection to tapping points on respective resistors 201, 202, each connected between the high tension terminals 66 and 67. The bias potential is such that both the valves are normally cut off by the suppressor grids, which are respectively connected to ground through the secondary windings of a transformer 203, and through equal resistors 204 and 205. The lower ends of the secondary windings of the transformer 203 are respectively connected to the corresponding control grids through blocking capacitors 206 and 207, and these secondary windings are so poled that equal and opposite voltages are respectively applied to the suppressor grids in response to a pulse applied to the primary winding, which has a centre tap connected to ground. The terminals of the primary winding are connected to conductors 27 and 28 through rectifiers 208 and 209.

The control grids of the valves 198 and 199 are connected to a second tapping point on resistor 201 chosen so as to bias the valves, when unblocked, at the lower end of the straight part of the anode current-grid voltage characteristic. The anodes of the valves are connected to opposite ends of the primary winding of the output transformer 210, this winding having a centre tap connected to terminal 66. The secondary winding is connected to the output conductors 31 and 32 which are also shown in Fig. 2.

As already explained, the coder 22 always produces positive digit pulses irrespective of the sign required by the code. At the same time as a digit pulse appears on the control grids of the valves 198 and 199, a negative control pulse of ½ microsecond duration appears on conductor 27 or 28 according as the $A_1$ pulse is negative or positive respectively. It will be assumed that the transformer 203 has been so poled that when a negative pulse appears on conductor 27, a positive pulse is applied to the suppressor grid of valve 198 and an equal negative pulse is applied to the suppressor grid of valve 199. This will unblock the valve 198, which then delivers a negative pulse to the upper end of the primary winding of the output transformer 210. It will be supposed that the transformer has been so poled that a negative output pulse (the $A_2$ pulse) then appears on conductor 31 and an equal positive output pulse (the $B_2$ pulse) is applied to conductor 32. Thus, if the speech voltage is negative, the positive pulse appearing on conductor 121 results in a negative pulse on conductor 31.

The conductor 31 is also connected to the mixer circuit 24 of Fig. 2, which is represented in Fig. 10 by a valve 211 with two control grids having substantially the same control characteristics. This valve could be replaced by two separate similar valves with the anodes and cathodes connected together.

Thus, if the speech voltage is negative, the $A_1$ pulse applied over conductor 17 (Fig. 2) is negative, and a negative digit pulse will be applied to the left hand control grid of the mixer valve 211 (Fig. 10). If, however, the speech voltage is positive, the $A_1$ pulse is positive, the $B_1$ pulse on conductor 18 (Fig. 2) is negative, and operates the right-hand multivibrator (Fig. 9) which delivers a negative pulse to conductor 28 instead of 27. From what has been explained, it will be clear that valve 199 (Fig. 10) will in this case be unblocked and a positive instead of a negative digit pulse will be delivered to the valve 211. Thus in this way the sign of the final output digit pulses is determined in accordance with the requirements of the code by the polarisation control device 19.

The conductors 31 and 32 are connected to the vernier digit amplifier 29 (Fig. 11) and to the timing and synchronising generator 38 shown in Figs. 2 and 12 for supplying thereto the $A_2$ and $B_2$ pulses.

A resistor 212 connected in series between the cathode of valve 211 and terminal 67 is arranged to bias the valve at the centre of the straight portion of the anode current-grid voltage characteristic. The usual anode load resistor 213 is provided, and the anode is connected through a blocking capacitor 214 to an output conductor leading to the transmitter 25 shown in Fig. 2.

The right hand control grid of the valve 211 is connected to a conductor 39 leading from the output of the timing and synchronising generator 38 (Figs. 2 and 12). This generator supplies over conductor 39 a pair of synchronising pulses during each period 120, and also a timing pulse to occupy the time position of any digit pulse which the coder requires to be absent, so that the valve 211 mixes the digit pulses which are present with the timing and synchronising pulses and supplies them all to the transmitter 25 (Fig. 2). A grid leak 215 is provided for the right-hand grid of the valve 211, since, as will be seen later, the conductor 39 is blocked by a rectifier in the generator 38 (Fig. 12). No leak resistor is needed for the other grid, which has a ground connection over conductor 31 in the vernier digit amplifier (Fig. 11).

The circuit of the timing and synchronising generator 38 (Fig. 2) is shown in Fig. 12. Timing wave No. 1, which consists of a train of alternate positive and negative pulses of ¼ microsecond duration is supplied over conductor 37 to the control grid of a pentode valve 216 the suppressor grid of which is connected to ground through a leak resistor 217. The bias of the valve is such that it is not cut off by the suppressor grid. The primary winding of an output transformer 218 is connected between the anode of the valve 216 and the positive high tension terminal 66. Positive timing pulses of ¼ microsecond duration are thus delivered from the secondary winding of the transformer 218 through an isolating rectifier 219 to the output conductor 39 leading to the mixer valve 211 of Fig. 10.

The $A_2$ and $B_2$ pulses from the polarisation restorer circuit 19 (Figs. 2 and 10) are supplied over conductors 31 and 32 and through rectifiers 220 and 221 to the suppressor grid of the valve 216, so that whenever a digit pulse is produced by the coder 22 (Fig. 6), the valve 216 will be blocked by whichever of the $A_2$ and $B_2$ pulses is negative, thus suppressing the corresponding timing pulse. If, however, the coder has not produced a digit pulse, a timing pulse takes its place in the output of the mixer valve 211, Fig. 10.

The synchronising pulses are produced in a similar way by a second pentode valve 222. The timing wave No. 1 is supplied from conductor 37 to the suppressor grid, while positive gating pulses from the tap 40 of the delay network 5 (Fig. 2) are supplied to the control grid over conductor 41. The valve 222 is biased by the network 223 in such manner that it is blocked both by the control grid and by the suppressor grid, and can only be unblocked if appropriate positive potentials are supplied simultaneously to both grids. During the period of each positive 1 microsecond gating pulse supplied over conductor 41 to the control grid in channel period No. 120, two positive ¼ microsecond pulses from the timing wave No. 1 are applied to the suppressor grid thus unblocking the valve, so that a pair of ¼ microsecond pulses is generated at the anode of valve 222. This pair of pulses is supplied through the output transformer 224 and through the isolating rectifier 225 in positive sense to conductor 39, and thence to the mixer valve 211 (Fig. 10).

It was explained above that the amplitudes of the timing pulses and of the synchronising pulses must be adjusted to ½E and 5½E respectively. This is done by means of a stabilised voltage source consisting of the cathode follower valves 226 and 227 and the gas discharge tube 228. The tube 228 is connected between the high tension terminals 66 and 67 in series with a resistor 229 and is shunted by two further resistors 230 and 231 connected in series. The valves 226 and 227 are provided with cathode resistors 232 and 233. The control grid of the valve 226 is connected to the junction point of resistors 230 and 231, and that of the valve 227 is connected to the junction point of the resistors 229 and 230.

It will be clear that the potential of the cathode of the valve 227 will be positive and will be proportional to and slightly less than the maintaining voltage of the tube 228, and this cathode potential will be taken to fix the level 5½E for the synchronising pulses. The cathode of the valve 227 is therefore connected through a rectifier 234 to the junction point of the rectifier 225 and the corresponding terminal of the secondary winding of transformer 224. The rectifier 234 is directed so that it is blocked in this condition. It will be clear therefore, that when a synchronising pulse is produced by the valve 222 its amplitude will be limited to the potential at which the rectifier 234 becomes unblocked, that is, it will be limited to 5½E.

The timing pulses are limited in like manner to an amplitude ½E by the valve 226. A tapping point on the resistor 232 is connected through the rectifier 235 to the junction point of the rectifier 219 and the corresponding terminal of the secondary winding of the transformer 218, and is directed in the same manner as rectifier 234. The tapping point on resistor 232 is chosen so that the potential thereat is ½E, thus limiting the amplitude of the timing pulse to ½E.

The cathode of the valve 226 is also connected over conductor 43 to the vernier digit amplifier (Fig. 11) to supply thereto a limiting voltage $v = 8.5e$, as will be explained later. Thus the resistances $R_1$ and $R_2$ of the resistors 230 and 231 should be so chosen that $$11R_2E/2(R_1+R_2) = 8.5e$$

The above arrangement assumes that $v$ is greater than ½E. It is probable, but not essential, that this will be so, and it depends on the maintaining voltages of the types selected for the gas discharge tubes 147 of Fig. 8 and 228 of Fig. 12. If $v$ is less than ½E, then the connection of conductor 43 and rectifier 235 to the resistor 232 should be interchanged, the values of the resistors 230 and 231 being of course adjusted in accordance with the above formula.

To make this clearer, an example will be given. The gas tubes 147 and 228 might conveniently be selected to have maintaining voltages of 80 volts and 150 volts respectively. Then $32e = 80$ volts and $5½E = 150$ volts, so $e = 2.5$ volts and $E = 27.3$ volts. Hence, $v = 21¼$ volts and $½E = 13.65$ volts, so $v$ is greater than ½E.

The type selected for the tube 126 (Fig. 6) is unimportant, since the final amplitudes of the digit pulses can be adjusted by suitably choosing the step-up ratio $z$ of the transformer 138 (Fig. 7), and/or the voltage amplification ratio $y$ of the polarisation restorer circuit 23 (Fig. 10). It would probably be convenient to choose both the tubes 126 and 147 to be of the same type.

The vernier digit amplifier 29 (Fig. 2) which is used to produce the second digit pulse, is shown in detail in Fig. 11. It comprises two pentode valves 236 and 237 arranged as a push-pull amplifier. The $A_1$ and $B_1$ pulses from the mean level restorer circuit 14 (Figs. 2 and 5) are applied over conductors 33 and 34 through rectifiers 238 and 239 to the control grids of the valves 236 and 237, respectively. The digit pulses $A_2$ and $B_2$ from the polarisation restorer circuit 23 (Figs. 2 and 10), are supplied over conductors 31 and 32, which are respectively connected to ground through adjustable potentiometers 240 and 241. The moveable contacts of these potentiometers are respectively connected to the control grids of the valves 237 and 236 through rectifiers 242, 243 and capacitors 244, 245. The anodes of these valves are connected to opposite ends of the primary winding of an output transformer 246, this winding having a centre tap connected to terminal 66. The secondary winding has a centre tap connected to ground, and its terminals are respectively connected through two delay networks 247 and 248, each introducing a delay of ½ microsecond, to the conductors 35 and 36 which lead to the polarisation control device 19 (Fig. 2 and Fig. 9).

The valves 236 and 237 are provided with cathode bias resistors 249 and 250 which also introduce some negative feedback, and bias the valves so that they are normally cut off by the suppressor grids, to both of which is connected the conductor 30 over which is supplied the timing wave No. 3 (see Fig. 2). The positive ¼ microsecond pulses of this timing wave are arranged to unblock the valves at the times when the $A_2$ and $B_2$ pulses, corresponding to the first digit pulse in each channel period, appear on conductors 31 and 32.

The conductors 35 and 36 are connected to respective rectifiers 251 and 252 directed to pass negative pulses through a blocking capacitor 253 to the control grid of a cathode follower valve 254 having a cathode load resistor 255. The control grid is connected to the cathode through a leak resistor 256, and it is also biased positively with a potential $4e$ over conductor 257 from the terminal 169 of the stabilised voltage source 42, Figs. 2, 6 and 8. The cathode of the valve 254 is connected through a rectifier 258 directed to pass negative pulses to the conductor 21 leading to the input of the coder 22 (Figs. 2 and 6).

The shunt resistor 259 is provided as a return path for the rectifiers 251 and 252 and the resistor 260 is likewise provided as a return path for the rectifier 258.

The conductor 43 derives a positive limiting potential from the timing and synchronising generator 38 (Figs. 2 and 12) and is connected through resistors 261 and 262 respectively to the junction points of elements 242, 244 and elements 243, 245. The resistors are shunted by rectifiers 263 and 264 which prevent the capacitors 244 and 245 from acquiring a permanent charge. The limiting potential applied over conductor 43 blocks the rectifiers 242 and 243 until the potential of the $A_2$ or the $B_2$ pulse (when positive) exceeds the limiting potential, thus effectively subtracting the limiting potential from the amplitude of the pulse. The reason for this will be explained later.

The first digit pulse which was generated by the coder 22 in the manner already explained, represents one of the four quantised amplitude values $5e$, $14e$, $23e$ or $32e$, and in order to obtain a second digit pulse with the help of the vernier digit amplifier, it is necessary to measure the difference between amplitude of the speech wave sample which was applied to the coder 22 and the particular one of the above four quantised values represented by the first digit pulse. To do this, a comparison pulse having the corresponding quantised amplitude is derived from the first digit pulse. The digit pulse amplitudes are 1½E, 2½E, 3½E and 4½E, the difference between the extreme values being 3E. The difference between the extreme values of the four quantised levels is 27e, so the digit pulse amplitudes must be multiplied by a factor $\mu=27e/3E=9e/E$. This will bring the smallest digit pulse amplitude to the value $9e/E \times 1.5E = 13.5e$. It is therefore necessary to subtract the voltage $v=8.5e$ from this to obtain the corresponding smallest comparison pulse of amplitude $5e$. The comparison pulses corresponding to the other three digit pulse amplitudes will then also have the desired values $14e$, $23e$ and $32e$, respectively.

The attenuation by the factor $\mu$ is produced by the potentiometers 240, and 241, and the voltage $8.5e$ to be subtracted is applied as a limiting voltage over conductor 43, which voltage blocks the rectifiers 242 and 243 until the attenuated digit pulse amplitudes has overcome the limiting voltage.

The amplitude and relative signs of the $A_1$ and $B_1$ pulses have already determined whether or not a first digit pulse is produced and also its amplitude and sign. If the speech voltage is negative, the $A_1$ pulse is negative and the $B_1$ pulse is positive, and they are applied as sample pulses over conductors 33 and 34 to the valves 236 and 237, respectively. The $A_2$ and $B_2$ pulses applied over conductors 31 and 32 give rise to comparison pulses from the potentiometers 240 and 241, and the amplitudes of these comparison pulses are adjusted as explained above to correspond to the amplitude of the first digit pulse. In the case being considered, of negative speech voltage, the pulse applied from potentiometer 241 is positive, and gets through the rectifier 243 to the control grid of valve 236, and the positive $B_1$ pulse gets through the rectifier 239 to the control grid of valve 237. Therefore, when the valves are unblocked by the timing pulse applied over conductor 30, pulses of opposite sign will be obtained at the ends of the secondary winding of the transformer 246, with equal amplitudes proportional to the difference between the amplitudes of the sample and comparison pulses. It will be assumed that when the amplitude of the sample pulse is greater than that of the comparison pulse, a negative output pulse $A_3$ is delivered to the delay network 247 and a positive output pulse $B_3$ is delivered to the delay network 248. If the input pulse amplitudes are interchanged, the signs of the $A_3$ and $B_3$ pulses are reversed. The gain of the amplifier formed by the valves 236 and 237 is such as to multiply the amplitude difference by 9. The output pulses are delay by $-\frac{1}{2}$ microsecond in the delay networks 247 and 248 and are supplied over conductors 35 and 36 to the polarisation control device 19 (Figs. 2 and 9) which they operate in the same way as previously described. Whichever of these pulses is negative is also applied to the control grid of the cathode follower valve 254, through the rectifier 251 or 252.

Consider now the particular case in which a negative amplitude of 10 steps is to be coded. Fig. 1 shows that a first negative digit pulse of amplitude $1\frac{1}{2}E$ is required to be followed by a second negative digit pulse also of amplitude $1\frac{1}{2}E$. After the production of the first digit pulse, a comparison is made by the vernier digit amplifier (Fig. 11), and a difference corresponding to one amplitude step $e$ is found. This difference is multiplied by 9 to produce an output pulse of amplitude $9e$. It is necessary in this case that the pulse applied to the coder 22 (Figs. 2 and 6) should be just sufficient to trigger the first coding stage with no excess. The voltage necessary for this is $5e$ and therefore $4e$ must be subtracted from the said output pulse before applying it to the coder. This is done by means of the limiting voltage $4e$ obtained from terminal 169 of the stabilised voltage source 42 (Fig. 8) over conductor 257 as shown also in Fig. 6. This blocks the rectifier 253 through the cathode follower valve 254 until the amplitude of the pulse applied to the control grid has reached the value $4e$. The pulse applied to the input conductor 21 to the coder has therefore had its amplitude reduced by $4e$, as required.

Consider now the coding of a negative amplitude of $14e$ steps. The first negative digit pulse appears with the level $2\frac{1}{2}E$, corresponding to $18e$ steps, and in this case the sample pulse applied to the vernier digit amplifier will be smaller than the comparison pulse by $4e$. A negative output pulse of amplitude $36e$ steps will therefore be applied to conductor 36 and the corresponding operation of the polarisation control device 19 (Figs. 2 and 9), will cause the polarisation restorer circuit 23 to produce a positive digit pulse instead of a negative one. The output pulse of amplitude $36e$ will have $4e$ subtracted by the valve 254 as just described and will be applied with amplitude $32e$ to the coder 22. This will operate all the coding stages to produce a digit pulse of amplitude $4\frac{1}{2}E$, which, as already said will be positive, as required by the code for amplitude $14e$ (see Fig. 1).

It will be clear from what has been explained that if the amplitude to be coded is positive instead of negative the same process is repeated, but with opposite signs in various parts of the circuit.

The delay of $\frac{1}{2}$ microsecond introduced by the delay networks 247 and 248 is to provide the necessary separation between the first and second digit pulses.

It will be evident that the coder would tend to be operated a third time when the second digit pulse is produced, but this does not occur, since the vernier digit amplifier will be blocked because there will be no corresponding unblocking pulse on conductor 30.

It has already been explained that the amplifier comprising the valves 236 and 237 must multiply the amplitude difference between the sample and comparison pulses by 9. It is also desirable for stability reasons that a relatively large amount of negative feedback should be used. The high gain required is difficult to obtain with a single push-pull stage, and it will be understood therefore that the valves 236 and 237 may each be replaced by two valves in cascade forming a two-stage push-pull amplifier.

It will be noted that the timing and synchronising pulses supplied to the mixer valve 211 of Fig. 10 are always positive, while the first digit pulse supplied to this valve is positive when the input voltage is positive and negative when it is negative. This is the reason why the timing pulses are shown in Fig. 1 to have opposite signs to the first digit pulses, since Fig. 1 shows only the case in which the speech voltage is negative. It will be clear also that the valve 211 will invert all the pulses applied to it; but this is obviously immaterial.

Figure 13:
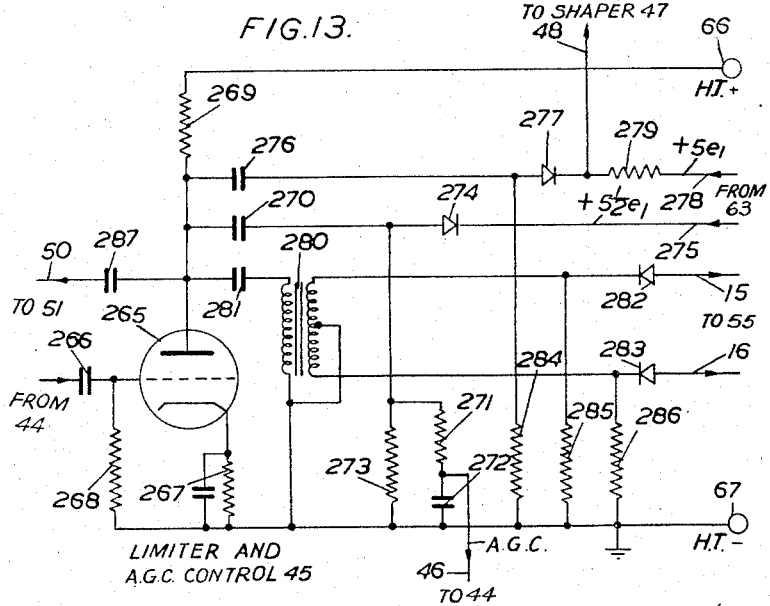

The details and operation of the transmitter circuit of Fig. 2 have now been described, and it is necessary to explain the receiver circuit, Fig. 3, in similar detail. The linear pulse amplifier 44 which amplifies the digit pulses, is a well known form of linear amplifier which need not be described in detail, provided with conventional automatic gain control arrangements operated by control voltages derived from the circuit 45 (Figs. 3 and 13) to which amplified pulses from the amplifier 44 are applied. The incoming pulses from the linear pulse amplifier 44 (Fig. 3) are applied to the control grid of a valve 265 (Fig. 13) through the blocking capacitor 266 with such polarity that the synchronizing pulses are negative. The valve 265 is appropriately biased by a resistor-capacitor network 267, and the usual leak resistor 268 is provided for the control grid. The anode load resistor is designated 269.

In order to generate the automatic control voltage for the amplifier 44 (Fig. 3), the anode of the valve 265 is connected through a blocking capacitor 270 and a resistor 271 to a grounded capacitor 272, the elements 271 and 272 being shunted by a further resistor 273. The capacitor 270 is also connected through a rectifier 274 to a conductor 275 to which is applied a positive voltage of $5\frac{1}{2}e_1$ from the stabilized voltage source 63 (Fig. 3), described later with reference to Fig. 14. The rectifier 274 is preferably a diode valve rather than a semiconductor rectifier, and directed to be normally blocked by this voltage. Assuming first that the earlier stages of the amplifier 44 have maximum gain, it will be seen that all positive pulses at the anode of the valve 265 will be limited in amplitude to substantially $5\frac{1}{2}e_1$, and the capacitor 272 will be charged up to a corresponding negative potential which is applied over conductor 46 as the automatic gain control voltage to the earlier stages of the amplifier 44. This voltage will reduce the gain of these stages until the amplitude of the largest positive pulses at the anode of the valve 265 (namely the synchronizing pulses) is susbtantially equal to $5\frac{1}{2}e_1$, and the synchronizing pulse amplitude will in this way be stabilized at this value irrespective of any changes in the input pulse level. It will be clear that the amplitude levels of the timing and digit pulses at the anode of the valve 265 will be at the same time stabilized at the values $\frac{1}{2}e_1$, $1\frac{1}{2}e_1$, $2\frac{1}{2}e_1$, $3\frac{1}{2}e_1$ and $4\frac{1}{2}e_1$.

In order to separate the synchronizing pulses from the others, the anode of the valve 265 is also connected through a blocking capacitor 276 and a rectifier 277 to an output conductor 48 leading to the synchronizing pulse shaping circuit 47 (Fig. 3). The rectifier 277 is held normally blocked by a positive potential of $5e_1$ applied from the stabilized voltage source 63 (Figs. 3 and 14) over conductor 278 and resistor 279. Thus only the synchronizing pulses whose amplitude is $5\frac{1}{2}e_1$ can unblock the rectifier 277 and reach the conductor 48.

The balanced output arrangement referred to in the description of Fig. 3, is obtained by means of a transformer 280 whose primary winding has one terminal connected to ground and the other to the anode of the valve 265 through a blocking capacitor 281. The secondary winding has a centre tap connected to ground and its terminals are connected respectively through rectifiers 282 and 283 to the output conductors 15 and 16 leading to the recoder driver unit 55 (Fig. 3). The transformer windings and the rectifiers 282 and 283 are so poled that a negative digit pulse at the anode of the valve 265 will produce a corresponding negative pulse on conductor 15, and a positive digit pulse at the anode of the valve 265 will produce a negative pulse on conductor 16.

Resistors 284, 285 and 286 provide return paths for the rectifiers 277, 282 and 283 respectively.

The pulses at the anode of the valve 265 are supplied to the conductor 50 leading to the timing wave selector 51 (Fig. 3) through a blocking capacitor 287.

Figure 14:
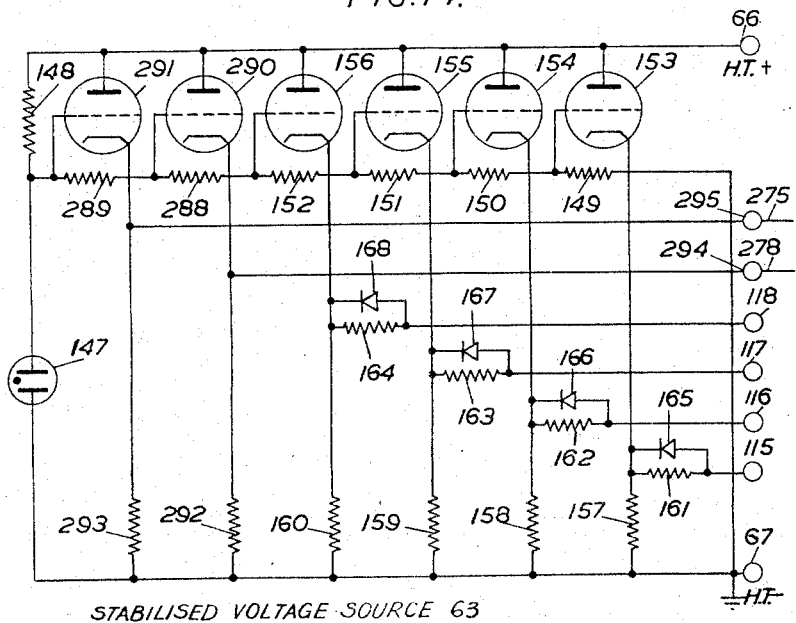

Fig. 14 shows the circuit of the stabilized voltage source 63 (Fig. 3). It is an extended form of Fig. 8, and those elements which appear in both figures are given the same designations. Two additional resistors 288 and 289 are connected in series between the resistors 152 and 148 and two corresponding cathode follower valves 290 and 291 are provided with cathode resistors 292 and 293, connected in the same way as the others. Two additional output terminals 294 and 295 are connected respectively to the cathodes of the valves 290 and 291 for supplying the potentials $5e_1$ and $5\frac{1}{2}e_1$ respectively to conductors 278 and 275 of Fig. 13.

In this case the resistors 149 to 152 and 288 are chosen equal to a suitable value R, while resistor 289 is chosen equal to $\frac{1}{2}R$. Then if $5\frac{1}{2}e_1/k$ is the maintaining potential of the tube 147, it will be evident that the potentials supplied to terminals 115, 116, 117 and 118 will respectively be susbtantially $e_1$, $2e_1$, $3e_1$, and $4e_1$, as required for the recoder 57 (Fig. 3); and the potentials supplied to terminals 294 and 295 will be substantially $5e_1$ and $5\frac{1}{2}e_1$, as required for the circuit of Fig. 13.

The pulses supplied over conductors 15 and 16 from the limiter circuit 45 (Fig. 3) go to a recoder driver unit 55 which is the same as the mean level restorer circuit shown in Fig. 5, except that the conductors 33 and 34 are not used. The unit 55 is supplied over conductor 20 with timing wave No. 1 from the timing wave selector 51 (Fig. 3), which wave unblocks the valves 91 and 92 (Fig. 5) during the centre of each pulse received by the unit 55, for the purpose of trimming these pulses. The pulses from the limiter circuit 45 are always negative and are proportional in amplitude to the input pulses. They are applied over conductor 15 or conductor 16 to the unit 55 (Fig. 5). Corresponding negative output pulses from the unit 55 are applied over conductor 21 to the recoder circuit 57 (Fig. 3).

The combined voltage transformation ratio of the transformer 280 (Fig. 13) and of the unit 55 (Fig. 6) is unity so that each pulse supplied to the recoder circuit 57 has an amplitude equal to one of the values $1\frac{1}{2}e_1$, $2\frac{1}{2}e_1$, $3\frac{1}{2}e_1$, and $4\frac{1}{2}e_1$, that is, equal to one of the amplitude levels at which the pulses at the output of the limiter 45 are stabilized.

The circuit of the decoder 57 is similar to that of the coder 22 at the transmitter and is shown in detail in Fig. 6. One difference is that; as already described, the reference voltage at terminals 115 to 118 are derived from the stabilised voltage source shown in Fig. 14 instead of from that shown in Fig. 8, and thus have values $e_1$, $2e_1$, $3e_1$ and $4e_1$. It will be clear that a digit pulse having any one of the four levels will trigger the corresponding coding stage as well as those corresponding to lower levels, but not one corresponding to a higher level; and a noise or interference voltage must exceed half a level before the coding stages can be incorrectly triggered.

Another slight modification of the circuit of Fig. 6 when used as the recoder 55 at the receiver is that the connection of the rectifier 130 is shifted to the upper end of resistor 127, so that all the coding stages limit at a voltage equal to the maintaining voltage of the tube 126. The output pulses produced by the triggering of the coding stages thus have amplitudes of four possible values in the ratio 1:2:3:4.

The pulse combining circuit 58 (Fig. 3) is shown in detail in Fig. 15. This circuit adds together the recoded pulses at the output of the recoder 55, corresponding respectively to the first and second digit pulses, with their proper relative values and with their proper signs, and in this latter respect it has similar features to the polarisation restorer circuit 23 (Figs. 2 and 10).

The circuit comprises two pairs of similar pentode valves, 296, 297 and 298, 299. The first pair deals with the recoded pulse corresponding to the first digit pulse, and the second pair deals with the recoded pulse corresponding to the second digit pulse.

All these valves are biased to be normally blocked by the suppressor grids, and valves 296 and 298 will be unblocked when the corresponding digit pulse represents a negative input voltage at the transmitter, while valves 297 and 299 will be unblocked when the digit pulse represents a positive input voltage. Thus for each digit pulse only one of the four valves will produce any output.

Each pair of valves is arranged as an amplifier with parallel input, but push-pull output. The conductor 121 from the output of the recoder 57 (Figs. 3 and 6) is connected to the respective pairs of control grids through capacitors 300, 301. The cathodes of the four valves are respectively connected to ground through resistor-capacitor networks 302, 303, 304 and 305, and to terminal 66 through resistors 306, 307, 308 and 309 for providing appropriate positive bias. Leak resistors 310 and 311 respectively connect to ground the control grids of the upper and lower pairs of valves.

The anodes of the valves 296 and 297 are connected through respective delay networks 312, 313 to opposite ends of the primary winding of a transformer 314, this winding having a centre tap connected to terminal 66. The transformer has two equal secondary windings 315 and 316. In order to indicate the poling of these windings, the ends of those three windings which have a given polarity at the same time are marked $a$, while the ends having opposite polarity are marked b. All the transformer windings in this figure are similarly designated, and a and b respectively signify the same polarity in all transformers.

In the case of transformer 314, the ends b and a of the windings 315 and 316 are connected respectively to the output conductors 317 and 318 leading to the antilogarithmic amplifier 59 (Fig. 3).

The anodes of the valves 298 and 299 are connected respectively to opposite ends of the primary winding of a transformer 319, this winding having a centre tap connected to terminal 66. The secondary winding has a centre tap connected to ground, and the a and b ends are connected respectively to the b and a ends of the windings 316 and 315 of transformer 314.

The unblocking of the valves is controlled by two transformers 320 and 321. The pulses of timing wave No. 2 from the divider circuit 52 (Fig. 3) are supplied to one terminal of the primary winding of transformer 320, the other terminal being connected to ground. The conductors 27 and 28 from the polarisation control device 56 (Figs. 3 and 9) are connected respectively to the b and a ends of the primary winding of the transformer 321. This transformer has two similar centre-tapped secondary windings 322 and 323, the centre taps of which are respectively connected to the a and b ends of the secondary winding of the transformer 320, this winding having a centre tap connected to ground. The a and b ends of the winding 322 are connected respectively to the suppressor grids of the valves 296 and 297, while the a and b ends of the winding 323 are connected respectively to the suppressor grids of the valves 298 and 299.

The circuit operates in the following manner. Assume that the first recoded pulse arriving over conductor 121 corresponds to a negative input voltage at the transmitting end. At the same time a positive ½ microsecond timing pulse arrives through transformer 320 and supplies a positive unblocking voltage to the suppressor grids of each of the valves 296 and 297. This voltage should, however, be insufficient by itself to unblock either valve. A negative voltage will be at the same time applied to the suppressor grids of the valves 298 and 299 which will have the effect of increasing the blocking voltage already applied thereto. At the same time, also, a negative pulse ($A_5$) is applied to conductor 27 and an equal positive pulse ($B_5$) to conductor 28 from the polarisation control device, as already explained. These pulses supply an additional positive unblocking voltage to the suppressor grid of the valve 296, but a negative voltage to the suppressor grid of the valve 297 which holds this valve blocked. The valve 296 will, however, be unblocked because the suppressor grid receives a positive voltage from both the transformers 320 and 321, and is the only one of the four to be unblocked. The recoded pulses applied to conductor 121 is positive, and will be passed by the valve 296 as a negative pulse through the delay network 312 to the b end of the primary winding of transformer 314. Thus corresponding negative and positive pulses are applied respectively to conductors 317 and 318 from the b and a ends of the windings 315 and 316. If the first coded pulse had corresponded to a positive input voltage, it is clear that the valve 297 would have been unblocked instead of the valve 296, because the $A_5$ and $B_5$ pulses applied to the conductors 27 and 28 by the polarisation control device would have been reversed in sign; and the signs of the pulses delivered to conductors 317 and 318 would also have been reversed.

The second coded pulse arrives on conductor 121 later by ½ microsecond than the first one, when the positive timing pulse applied through transformer 320 will have been replaced by a negative pulse. It will be evident that the second recoded pulse will find one of the two valves 298 or 299 unblocked, according as a negative or a positive pulse is applied to conductor 27. If the valve 298 is unblocked then the transformer 319 supplies a negative pulse without any delay to conductor 317 and a positive pulse to conductor 318, and these pulses will coincide in time with the pulses supplied by the transformer 314 in response to the first partial pulse. If the valve 299 is unblocked instead of 298 then the pulses supplied to conductors 317 and 318 by transformer 319 will be reversed in sign. The two recoded pulses are thus added together with their proper signs.

The valves 296 to 299 when unblocked should be biased to the lower end of the straight part of the anode current-control grid voltage characteristic.

By reference to Fig. 1, it will be seen that the first digit pulse (when it appears alone) corresponds to 9, 18, 27 or 36 amplitude steps, while the second digit pulse alone corresponds to 1, 2, 3 or 4 steps. Therefore in order that the two recoded pulses shall be combined at the proper levels, it is necessary to arrange that the amplifier formed by the valves 298 and 299 shall provide a voltage amplification ratio which is one ninth of that provided by the other amplifier.

This can be arranged, for example, by giving the transformer 319 a transformation ratio which is one ninth that of the transformer 314.

The combined recoded pulses supplied to conductors 317 and 318 then represent the corresponding original speech wave sample in quantised form, and are supplied to the antilogarithmic amplifier 59 (Fig. 3), which is of well-known form, and need not therefore be further described.

Details of the receiving channel unit 60 (Fig. 3) are shown in Fig. 16. The pulses from the antilogarithmic amplifier 59 (Fig. 3) are applied to the suppressor grid of the gating valve 324 through a capacitor 325. This valve is provided with a cathode resistor 326 providing sufficient positive bias voltage so that it will be blocked by the control grid, which is connected to ground through a resistor 327. The suppressor grid is connected through a resistor 328 to a tapping point on the resistor 326 so chosen as to bias the suppressor grid to the centre of the straight portion of the characteristic curve. The gating pulses from the appropriate tapping point of the delay network 49 (Fig. 3) are applied through a capacitor 329 to a tapping point on the resistor 327.

The anode of the valve 324 is connected to terminal 66 through a load resistor 330, and to the input terminal of a low pass filter 331 through a capacitor 332. The filter recovers the speech wave from the train of channel pulses produced by the valve 324 and passes the recovered wave to the control grid of an amplifying valve 333 having its anode connected to terminal 66 through the primary winding of an output transformer 334, of which the secondary winding has one end connected to ground and the other end to the output terminal 62.

In order to receive a supervisory signal, which, as already explained, is transmitted by applying a negative voltage to terminal 90 of the corresponding channel unit 7 at the transmitting end (Figs. 2 and 4), the anode of the valve 324 is connected through a capacitor 335 to a rectifier 336 which rectifies the pulses and builds up a negative charge on the capacitor 337 shunting the grid resistor 338 of a valve 339. Connected in series between the anode of the valve 339 and terminal 66 is a relay 340 of any suitable type which operates signalling devices over conductors such as those indicated by 341. Under normal conditions the valve 339 will be conducting and the relay 340 will be operated, but when the supervisory signal is applied at the transmitting end, a train of negative pulses of maximum amplitude will be generated by the anode of the valve 324 and this will generate a sufficient negative bias potential in the capacitor 337 to cut off the valve 339 and release the relay.

When the normal speech signals are received, pulses of various amplitudes and signs will be generated by the valve 324 and it is arranged that the much lower potential so produced in the capacitor 337 is insufficient to release the relay 340.

The timing and synchronising operations at the receiving end have already been described with reference to Fig. 3. The synchronising pulse shaper 47, the timing wave selector 51, and the dividing circuit 52 are well-known circuits and need not therefore be described in detail. The synchronising pulse shaper 47 supplies pulses to a delay network distributor 49, and pulses reach the tapping points 61 connected to the channel units 60 at the proper times to unblock the channel units in turn to accept the corresponding channel pulses. The channel gating arrangements associated with the delay network are similar to those described in U. S. Patent 2,462,111, and British Patent 635,472 already referred to.

In certain of the devices which have been described above, negative feedback is provided for stabilisation purpose by means of a cathode series resistor. In these devices also, the amplifier is normally blocked by the suppressor grid. If desired the negative feedback may be introduced by connecting screen grid to the positive high tension terminal through an appropriate load resistor and coupling it to the control grid through a capacitor. The cathode resistor should in this case be shunted by a by-pass capacitor.

In the preferred embodiment of the invention which has been described in detail, there are two digit pulses in the code, each pulse having four amplitude levels. It will be obvious that the arrangements can be easily modified to provide any other number of amplitude levels by providing the necessary number of coding stages in the coder (or recoder) Fig. 6, and the corresponding stabilised voltages in Fig. 8 or 14. It is also possible to adapt the arrangements for more than two digits, as will be explained presently.

A particularly simple system according to the invention is produced when $n=1$. Each digit pulse then represents three conditions ($+$, $-$ or zero), and if a three-digit code is used, 27 quantised amplitudes can be represented. This may be quite good enough for a system in which the highest quality of reproduction is not necessary, and only one coding stage is required in the coder or recoder.

In order to deal with more than two digits, the vernier digit amplifier, Fig. 11, needs modification and appears as shown in Fig. 17, in which those elements which are the same as in Fig. 11 have been given the same designation numbers.

It will be assumed that the code comprises $m$ digit pulses each of which can assume $n$ positive and $n$ negative amplitudes or levels, and so the coder (Fig. 6) should accordingly be provided with $n$ coding stages. The valves 236 and 237 of the vernier digit amplifier should be designed to produce a voltage gain of $(2n+1)$.

It will be assumed, for example, that the number of channels and the sampling frequency are adjusted so that, as before, a regular train of digit or timing pulses of ¼ microsecond duration is transmitted, the repetition frequency being 2 megacycles per second.

For a four-digit system, therefore, it is possible to provide 59 communication channels and 1 synchronising channel instead of 119 communication channels and 1 synchronising channel, as before.

It will be further assumed that the channel units 7 (Fig. 2) will be designed to produce the A and B pulses during a period of duration ½ microsecond right at the beginning of each channel period.

In Fig 17 the valves 236 and 237 are arranged practically in the same way as in Fig. 11, but the principal difference is that the timing wave No. 3 is not now applied to the suppressor grids of the valves, which are connected directly to the cathodes. Two additional rectifiers 342 and 343 are provided, connecting the outputs of the delay networks 247 and 248 to the control grids of the valves 236 and 237 respectively, and directed to supply positive pulses to these control grids. The rectifiers 251 and 252 have also been reversed for a reason which will be explained.

The cathode follower valve 254 of Fig. 11 is represented in Fig. 17 by a pair of valves 344, 345 not operated as cathode followers, both valves being cut off by the suppressor grids. The control grids are connected together and to the junction point of the cathode resistors 346 and 347 of the valve 345 through a leak resistor 348. The control grids are also connected to the junction point of the rectifiers 251 and 252 through a blocking capacitor 349.

Two new timing waves called No. 4 and No. 5 must be generated in some convenient way. The first of these, No. 4, should consist of a train of pulses each of ¼ microsecond duration and repeated at the rate of 2 million pulses per second, except that every $m$th pulse should be missing, where $m$ is the number of digits of the code. The second timing wave (No. 5) should consist of the pulses which are missing from the first train, i.e. it should consist of pulses each of ¼ microsecond duration repeated at the rate of $2/m$ million pulses per second. The two timing waves should be phased so that the pulses of wave No. 5 occur at the times of the missing pulses of wave No. 4. These waves are derived from the master generator 1 of Fig. 2 in a manner which will be clear to those skilled in the art and which therefore need not be described.

Timing wave No. 4 is applied to conductor 350 and thence through the transformer 351 between the suppressor grid and cathode of valve 345, in such manner that the valve is unblocked by each of the pulses of the timing wave. Likewise, timing wave No. 5 is applied to conductor 352 and thence through transformer 353 between the suppressor grid and cathode of the valve 344 in the same manner.

The first digit pulse will be generated by the coder 22 (Fig. 2) in the manner already explained, and will be fed back to the vernier digit amplifier Fig. 17 consisting of the valves 236 and 237, which in this case are always unblocked. The rectifiers 251 and 252 having been reversed, it is now the positive output difference pulse which is applied to the valves 344 and 345. Except in the case of the last digit pulse, the valve 345 is the one which will be opened by the timing wave No. 4 and it will pass a corresponding negative pulse through the rectifier 354 and the conductor 21 to the coder 22.

It is to be noted also that the output pulse from the valves 236 and 237 is fed back again to one of the control grids through one of the rectifiers 342, 343 and takes the place of the $A_1$ or $B_1$ pulse from the mean level restorer circuit 14 (Fig. 2) which were applied over conductors 33 and 34. The process is repeated in order to produce the third digit pulse, and so on.

In the case of the last digit pulse, the valve 344 is opened by the timing wave No. 5, there being no pulse in timing wave No. 4 to open valve 345. In this case, the output pulse has the necessary amount of $ne$ subtracted, for a reason which will be explained later. This subtraction has always to be done for the last digit whatever the number of digits. The anode of the valve 344 is connected to the output conductor 21 through a rectifier 355, the lower end of which is connected through a resistor 356 shunted by a rectifier 357 to conductor 257 which leads to terminal 169 of the stabilised voltage source 42 (Figs. 2 and 6). Thus substantially no output is obtained at conductor 21 until the bias voltage on conductor 257 has been exceeded.

If the general case be considered in which there are $m$ digit pulses each capable of assuming $n$ positive and $n$ negative levels (making a total of $(2n+1)$ levels, including zero), then the total number of different signal amplitudes values which can be represented by the code is $(2n+1)^m$.

The formula representing any one of these values is $$A = e[a_1(2n+1)^{(m-1)} + a_2(2n+1)^{(m-2)}$$
$$+ a_3(2n+1)^{(m-3)} + \ldots + a_{(m-2)}(2n+1)^2$$
$$+ a_{(m-1)}(2n+1) + a_m]$$

in which each of the coefficients $a$ can take any of the values $0, +1, +2, \ldots +n$.

The coefficient $a_r$ is indicated by the $r$th digit pulse of the code group. Also, it is clear that the $m$th or last digit pulse should appear alone for the lowest values of $A$ from $e$ to $ne$. Thus the $(m-1)$th digit pulse should appear with the lowest level for the value $(n+1)e$; but since this pulse at the lowest level represents a value $(2n+1)e$, the $m$th digit pulse should be also present at level $n$ and with the opposite sign since $$(n+1)e = (2n+1)e - ne$$

This will be seen to be in accordance with the 2-digit case represented by Fig. 1, where $n=4$. When the input level $A$ has the low value $(n+1)e$, therefore, it is necessary that the bias of the first coding stage 100 of Fig. 6 be such that it cannot be triggered until the instant corresponding to the $(m-1)$th digit pulse.

When there is no output from the coder 22 (Fig. 2), there will be no voltage applied to either of the conductors 31, 32 of Fig. 17, and so the voltage $(n+1)e$ which appears on conductor 33 or 34 will then simply be multiplied by $(2n+1)$ by the vernier digit amplifier before being delayed and re-applied to input of the amplifier, and to the coder 22 (Fig. 2) over conductor 21. Every time the input voltage is reapplied to the vernier digit amplifier, its amplitude will evidently be multiplied by $(2n+1)$ so long as no output is obtained from the coder. Thus at the moment when the $(m-1)$th digit pulse is due to be produced, the input voltage, whose original value was $(n+1)e$, will have been multiplied $(m-2)$ times by $(2n+1)$, and so its value will have become $(n+1)e(2n+1)^{(m-2)}$. This therefore is the bias voltage required for the first coding stage 100 of the coder (Fig. 6), in order that the $(m-1)$th digit pulse may be the first digit pulse to be produced in response to an input voltage of $(n+1)e$. This digit pulse should evidently be emitted at the lowest level 1½E.

It should be evident from a consideration of Fig. 1, that the $(m-1)$th digit pulse should appear at the level 2½E when the input voltage $(n+1)e$ has increased by $(2n+1)e$, and more generally, the $(m-1)$th digit pulse should appear at the $r$th level $(r+\frac{1}{2})E$ when the input voltage $(n+1)e$ has increased by $(r-1)(2n+1)e$. It therefore follows that the triggering levels of the $n$ coding stages of the coder (Fig. 6) will be given by the formula $$(n+1)e(2n+1)^{(m-2)} + (r-1)e(2n+1)^{(m-1)}$$

in which $r$ takes all integral values from 1 to $n$.

This formula gives the values of the bias voltages to be supplied by the stabilised voltage source 42 (Figs. 6 and 8) for the general case of a code of $m$ digit pulse each having $n$ positive and negative amplitude levels.

In order to determine the attenuation to be provided by the potentiometers 240 and 241 of Fig. 17 for the general case, it may be pointed out that the $n$ quantised values corresponding to the appearance of the first digit pulse alone will be $ke(2n+1)^{(m-1)}$ where $k$ takes all values from 1 to $n$. The difference between the largest and the smallest of these values is $(n-1)e(2n+1)^{(m-1)}$, and the difference between the largest and smallest output digit pulse is evidently $(n-1)E$. The attenuation introduced by the potentiometers 240 and 241 should therefore correspond to a voltage ratio of $$[(n-1)e(2n+1)^{(m-1)}] / [(n-1)E]$$
$$= (e/E)(2n+1)^{(m-1)}$$

This attenuation will reduce the amplitude of the smallest digit pulse (1.5E) to $(3e/2)(2n+1)^{(m-1)}$. The smallest digit pulse (1.5E) however corresponds to a voltage $e(2n+1)^{(m-1)}$, and the amount to be subtracted from $(3e/2)(2n+1)^{(m-1)}$ to produce this value is evidently $(e/2)(2n+1)^{(m-1)}$. This subtraction is effected by means of the conductor 43 (Fig. 17) which derives this bias voltage from the generator 38 (Fig. 12).

The output pulse from the valves 236 and 237 of Fig. 17 corresponding to the last digit passes through the valve 344 in order to have $ne$ units subtracted from it as already mentioned. The reason for this can be most easily seen by assuming a particular value to be coded, namely $(2n+2)e$. This is represented by the $(m-1)$th and $m$th digit pulses only each at level 1½E. The comparison pulse produced in response to the $(m-1)$th digit pulse will have amplitudes $(2n+1)e$ and when subtracted from the sample pulse $(2n+2)e$ by the valves 221 and 222 will produce an output $e$, which when multiplied by $(2n+1)$ becomes again $(2n+1)e$. This is used to trigger the first coding stage, which, as has been already explained, should be biased with voltage $(n+1)e$, and therefore requires a triggering pulse of amplitude $(n+1)e$. The amplitude of the pulse at the output of the vernier digit amplifier is thus too great by $ne$, and it is preferable, therefore to subtract this amount by means of the bias of $ne$ applied over conductor 257 (Fig. 17).

The reason why this subtraction does not have to be done for the earlier digits is that the effect of the excess triggering voltage is corrected by the following digits, and it is only in the case of the last digit, which has no digits to follow, that the subtraction has to be done.

If there are more than two digits, the pulse combining circuit at the receiver (Fig. 15) must be extended by the provision of an additional pair of valves for each additional digit. Fig. 18 shows the arrangement for a total of three digits. Two extra valves 358, 359 are arranged similarly to the other pairs of valves with elements 360, 361, 362 and 363 corresponding respectively to elements 300, 302, 303 and 310. The transformer 321 has a third secondary winding 364, similar to the others, connected to the suppressor grids of the valves 358 and 359.

The valves 358 and 359 are provided with an output transformer 365 similar to 314 and 319. The anodes of the valves are connected to the terminals of the primary winding of transformer 365 through delay networks 366 and 367. The output conductor 317 is connected through one half of the secondary winding of each of the transformers 314, 319, and 365 to ground, and the output conductor 318 is connected through the other half of the secondary winding of each transformer to ground.

To the centre points of the three secondary windings of transformer 321 are connected three timing conductors 368, 369, 370. To these conductors are respectively supplied three timing waves each consisting of ¼ microseconds positive pulses having a repetition period of 1½ microseconds, the pulses of the three waves being staggered so that they occur at different times with ¼ microsecond intervals between any two pulses.

It will be seen that the recoded pulses corresponding to a given sample of the signal wave will be supplied to all the pairs of valves over conductor 121, and the pairs of valves will be opened in turn to accept the respective digit pulses when they are due to arrive. The delay networks 366 and 367 introduce a delay of 1 microsecond, and the delay networks 312 and 313 introduce a delay of ½ microsecond, by which means all the recoded digit pulses corresponding to a given sample will arrive at conductors 317 and 318 superposed.

It will be evident that if the code involves $m$ digits there should be $m$ pairs of valves arranged similarly to those shown in Fig. 18, and the delay networks should be so proportioned that all the recoded digit pulses arrive superposed at the output conductors 317 and 318.

While the principles of the invention have been described above in connection with specific embodiments, and particular modifications thereof, it is to be clearly

What I claim is:

1. A transmitter for an electric pulse code modulation system of communication comprising means for producing from a complex electrical wave a pulse of invariable sign, but having an amplitude representing the instantaneous amplitude of the said wave with respect to a mean level, quantising means for quantising the said pulse, separate means for indicating the sign of the said instantaneous amplitude with respect to the said mean level, means under the control of the said quantising means and of the said separate means for producing a group of one or more digit pulses according to a code of two or more elements, any digit pulse having an amplitude selected from a series of $n$ positive and $n$ respectively equal negative amplitudes, where $n$ is an integer, and means for transmitting the digit pulses over a communication medium.

2. A receiver for an electric pulse code modulation system of communication in which an instantaneous amplitude value of a complex electrical wave is represented by a group of one or more digit pulses according to a code of two or more elements, any digit pulse having an amplitude selected from a series of $n$ positive and $n$ respectively equal negative amplitude, where $n$ is an integer, comprising means for receiving the digit pulses from a communication medium, means for producing from each digit pulse an intermediate pulse of invariable sign but having an amplitude representing the amplitude of the digit pulse irrespective of its sign, recoding means for deriving from the intermediate pulse a derived pulse having an amplitude proportional to the instantaneous amplitude represented by the digit pulse when present by itself in the group, separate means for indicating the sign of the digit pulse, means under the control of the said recoding means and of the said separate means for producing from the derived pulses corresponding to a group of digit pulses an output pulse which represents in quantised form an instantaneous amplitude value of the complex electrical wave, and means for recovering from the output pulses an approximate replica of the said complex electrical wave.

3. An electric pulse code modulation system of communication comprising a transmitter according to claim 1 connected over a communication medium to a receiver comprising means for receiving the digit pulses from the communication medium, means for producing from each digit pulse an intermediate pulse of invariable sign but having an amplitude representing the amplitude of the digit pulse irrespective of its sign, recoding means for deriving from the intermediate pulse a derived pulse having an amplitude proportional to the instantaneous amplitude represented by the digit pulse when present by itself in the group, separate means for indicating the sign of the digit pulse, combining means under the control of the said recoding means and of the said separate means for producing from the derived pulses corresponding to a group of digit pulses an output pulse which represents in quantised form an instantaneous amplitude value of the complex electrical wave, and means for recovering from the output pulses an approximate replica of the said complex electrical wave.

4. A transmitter according to claim 1 in which the means for producing a group of one or more digits comprises coding means, biasing means connected to said coding means for determining the amplitude level of the output digit pulses and comprising a plurality of predetermined potential values differing by a predetermined amount, whereby said digit pulse amplitude levels differ by equal steps.

5. A system according to claim 3 comprising means at the transmitter for transmitting over the communication medium a timing pulse in place of any digit pulse which requires to be missing according to the code, such timing pulse having an amplitude less than the minimum amplitude of any digit pulse.

6. A multichannel system according to claim 5 in which the communication time is divided into a plurality of equal time periods corresponding respectively to the channels of the system, one such period being set aside at regular intervals as a synchronising period, comprising means at the transmitter for transmitting over the communication medium during the synchronising period a group of synchronising pulses having an amplitude greater than the maximum amplitude of any digit pulse, the pulses of all kinds being so timed that they are transmitted at regular intervals over the communication medium, means at the receiver for deriving from the train of received pulses a timing wave for controlling the combining pulses a timing wave for controlling the combining means, and means for selecting the synchronising pulses for controlling the distribution of the output pulses to the respective channels.

7. A system according to claim 6 in which the means for transmitting timing pulses in place of digit pulses which are required to be missing according to the code and the means for transmitting a group of synchronizing pulses comprise amplifier means having two input circuits, one circuit connected to receive timing pulses and the other circuit connected to receive synchronizing pulses, a mixer circuit in which the timing pulses, the synchronizing pulses and the digit pulses are combined, amplifier biasing means having potential values such that in the mixer circuit the amplitude level of the timing pulses is less by one step than the minimum amplitude level of the digit pulses and the amplitude level of the synchronizing pulses is greater by one step than the maximum amplitude level of the digit pulses.

8. A system according to claim 6 comprising means at the receiver controlled by the received synchronising pulses for adjusting the amplitude levels of the received pulses to specified absolute values.

9. A system according to claim 1, comprising means for producing respectively in two separate circuits a pair of sample pulses of equal amplitude proportional to the instantaneous amplitude of the complex electrical wave, and with opposite signs, the sign of the sample pulse in a given one of the said circuits being the same as that of the said instantaneous amplitude, and means for applying one of the sample pulses to the quantising means for generating a corresponding digit pulse, the said separate means including polarisation control means controlled in accordance with the sign of the sample pulse in the given circuit for controlling accordingly the sign of the said digit pulse.

10. A system according to claim 9 comprising means for producing each of the succeeding digit pulses of the group, including means for deriving from the digit pulse or pulses already produced a comparison pulse of amplitude equal to the instantaneous amplitude which it, or they together, represent, and having the same sign, means for subtracting the comparison pulse from the corresponding sample pulse, and for multiplying the amplitude difference by $2n+1$, means for generating a pair of pulses having respectively opposite signs and having amplitudes equal to the multiplied amplitude difference, and means for delaying the last-mentioned pair of pulses and for applying one of them to the coder and the other to the polarisation control means.

11. A system according to claim 3 comprising at the receiver means for producing respectively in two separate circuits from each received digit pulse a pair of intermediate pulses of equal amplitude and with opposite sign, the sign of the intermediate pulse in a given one of the said circuits being the same as that of the original digit pulse, means for applying one of the intermediate pulses to the recoding means for generating a corresponding derived pulse, the said separate means including polarisation control means controlled in accordance with the sign of the intermediate pulse in the given circuit for controlling accordingly the sign of the said derived pulse, means for dividing the amplitude of the derived pulse corresponding to the $r^{th}$ digit pulse by $(2n+1)^{(r-1)}$, means for delaying the derived pulses by such times as will render them all coincident in time, and means for applying the delayed and divided derived pulses to the combining means in order to produce the said output pulse.

12. A system according to claim 9, in which the polarisation control means comprises a pair of similar multivibrators to which the said two separate circuits are connected, and two separate output conductors connected respectively to the multivibrators, the arrangement being such that each multivibrator is adapted to be triggered if a pulse of one given sign is applied over the corresponding one of the two separate circuits, and on being triggered delivers a control pulse of the given sign to the corresponding output conductor.

13. A system according to claim 12 comprising a normally blocked balanced amplifier, to which the said separate output conductors are connected, means for applying the digit pulses from the quantising means or the derived pulses from the recoding means to the balanced amplifier, and means for applying the control pulse to unblock the balanced amplifier in such manner as to cause it to generate a positive or a negative output pulse in response to each digit or derived pulse according as the control pulse is applied over one output conductor or the other.

14. A transmitter according to claim 13 in which the quantising device comprises $n$ similar stages each consisting of a multivibrator adapted to be triggered by an applied pulse if of sufficient amplitude, the pulse being applied to each multivibrator over a corresponding rectifier held blocked by a fixed limiting voltage, the limiting voltages for the respective multivibrators being chosen to define $n$ discrete amplitude levels.

15. A transmitter according to claim 14 including combining means to which the output of the $n$ multivibrators are connected in series in such manner that the pulses generated by all multivibrators which are triggered are added together.

16. A transmitter according to claim 15 comprising means for applying a specified limiting voltage to the output of each multivibrator through a rectifier which is blocked until the amplitude of the output pulse exceeds the limiting voltage, thereby definitely fixing the amplitude of the output pulse.

17. A transmitter for an electric pulse code modulation system of communication comprising means for producing from a complex electrical wave a pulse of invariable sign, but having an amplitude representing the instantaneous amplitude of the said wave with respect to a mean level, quantising means for quantising the said pulse, separate means for indicating the sign of the said instantaneous amplitude with respect to the said mean level, means under the control of the said quantising means and of the said separate means for producing a group of one or more digit pulses according to a code of two or more elements, any digit pulse having an amplitude selected from a series of 4 positive and 4 respectively equal negative amplitudes, and means for transmitting the digit pulses over a communication medium.

18. A transmitter for an electric pulse code modulation system of communication comprising means for producing from a complex electrical wave a pulse of invariable sign, but having an amplitude representing the instantaneous amplitude of the said wave with respect to a mean level, quantising means for quantising the said pulse, separate means for indicating the sign of the said instantaneous amplitude with respect to the said mean level, means under the control of the said quantising means and of the said separate means for producing a group of one or more digit pulses according to a code of two or more elements, any digit pulse having an amplitude selected from values in the ratios 1½:1, 2½:1, 3½:1 and 4½:1.

19. A transmitter according to claim 1 in which the means for transmitting the digit pulses over a communication medium comprises means to frequency modulate the transmitter in accordance with said digit pulses.

References Cited in the file of this patent

UNITED STATES PATENTS

| | | |
|---|---|---|
| 2,272,070 | Reeves | Feb. 3, 1942 |
| 2,557,950 | Deloraine et al. | June 26, 1951 |
| 2,724,740 | Cutler | Nov. 22, 1955 |
| 2,759,047 | Meacham | Aug. 14, 1956 |

OTHER REFERENCES

Monograph B–1491 Bell Telephone System Technical Publications, 5 pages.